(12) United States Patent
Sato et al.

(10) Patent No.: US 10,826,261 B2
(45) Date of Patent: Nov. 3, 2020

(54) METHOD FOR MANUFACTURING TERMINAL-EQUIPPED ELECTRIC WIRE, AND TERMINAL-EQUIPPED ELECTRIC WIRE

(71) Applicant: Yazaki Corporation, Tokyo (JP)

(72) Inventors: Tomoya Sato, Shizuoka (JP); Naoki Ito, Shizuoka (JP); Yasunori Nabeta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/200,910

(22) Filed: Nov. 27, 2018

(65) Prior Publication Data

US 2019/0165535 A1 May 30, 2019

(30) Foreign Application Priority Data

Nov. 28, 2017 (JP) ................................. 2017-227445

(51) Int. Cl.
| | | |
|---|---|---|
| *H01R 43/058* | (2006.01) | |
| *H01R 4/18* | (2006.01) | |
| *H01R 43/048* | (2006.01) | |
| *H01R 43/28* | (2006.01) | |
| *B23K 20/00* | (2006.01) | |

(52) U.S. Cl.
CPC ......... *H01R 43/048* (2013.01); *B23K 20/004* (2013.01); *H01R 43/058* (2013.01); *H01R 43/28* (2013.01); *H01R 4/185* (2013.01)

(58) Field of Classification Search
CPC ... H01R 43/048; H01R 43/058; H01R 43/028
See application file for complete search history.

(56) References Cited

U.S. PATENT DOCUMENTS

| | | | |
|---|---|---|---|
| 6,393,924 B1 | 5/2002 | Eder et al. | |
| 7,033,233 B2* | 4/2006 | Fujimoto | B23H 11/006 439/874 |
| 7,174,633 B2* | 2/2007 | Onuma | H01R 4/04 29/854 |

(Continued)

FOREIGN PATENT DOCUMENTS

| | | |
|---|---|---|
| JP | 2003-338327 A | 11/2003 |
| JP | 2009-231079 A | 10/2009 |

(Continued)

*Primary Examiner* — Xuong M Chung Trans
(74) *Attorney, Agent, or Firm* — Sughrue Mion, PLLC

(57) ABSTRACT

A method for manufacturing a terminal-equipped electric wire includes forming, in an electric wire, a bonded portion in which strands of a conductor exposed due to absence of a sheath are bonded to each other. A terminal including a wire barrel portion is fixed to the electric wire such that the wire barrel portion covers at least a part of the bonded portion. A sectional shape of the bonded portion before the fixing of the terminal is formed in such a shape that a variable range of a value of a distance between a geometric center of a cross section of the bonded portion and the wire barrel portion falls within a range of 0.71 to 1.29 when rotating the bonded portion by an arbitrary angle while engaging the bonded portion with the wire barrel portion within the wire barrel portion.

6 Claims, 19 Drawing Sheets

(56) References Cited

U.S. PATENT DOCUMENTS

| | | | |
|---|---|---|---|
| 7,931,510 B2* | 4/2011 | Fukase | H01R 4/185 |
| | | | 439/442 |
| 10,128,628 B2* | 11/2018 | Ootsuka | H01R 4/18 |
| 10,367,319 B2 | 7/2019 | Matsui et al. | |
| 2003/0226823 A1* | 12/2003 | Fujimoto | B23H 11/006 |
| | | | 219/56.1 |
| 2011/0094797 A1 | 4/2011 | Otsuka et al. | |
| 2013/0025935 A1* | 1/2013 | Takayama | H01R 4/184 |
| | | | 174/75 R |
| 2017/0264064 A1 | 9/2017 | Matsui et al. | |

FOREIGN PATENT DOCUMENTS

| | | |
|---|---|---|
| JP | 2011-81918 A | 4/2011 |
| JP | 2016-115505 A | 6/2016 |
| WO | 2010/058786 A1 | 5/2010 |

\* cited by examiner

METHOD FOR MANUFACTURING TERMINAL-EQUIPPED ELECTRIC WIRE, AND TERMINAL-EQUIPPED ELECTRIC WIRE

CROSS REFERENCE TO RELATED APPLICATION

This application is based upon and claims the benefit of priority from the prior Japanese Patent Application No. 2017-227445 (filing date: Nov. 28, 2017), the entire contents of which are incorporated herein by reference.

BACKGROUND

Technical Field

The present invention relates to a method for manufacturing a terminal-equipped electric wire, and more particularly to a method of forming a sectional shape of a bonded portion provided in a conductor before fixing of a terminal into a predetermined shape.

Related Art

Conventionally, a terminal-equipped electric wire 301 as illustrated in FIGS. 25C and 26 is known (see JP 2009-231079 A).

This terminal-equipped electric wire 301 is manufactured as follows. First, an exposed conductor 305 at a distal end portion of an electric wire 307 (see FIG. 25A) in which a sheath 303 is removed to expose the conductor (core wire) 305 at one end is bonded by ultrasonic bonding (see FIG. 25B).

That is, the distal end portion of the conductor 305, including a plurality of strands 311, is bonded by ultrasonically bonding the respective strands 311, thereby forming a bonded portion 309.

A terminal 315 is fixed to the bonded portion 309 by crimping a wire barrel portion 313 to obtain the terminal-equipped electric wire 301.

SUMMARY

Meanwhile, when a shape of the bonded portion 309 is formed in a rectangular parallelepiped shape (a shape of a cross section taken along a plane orthogonal to the longitudinal direction is a rectangular shape), right and left biting portions of the wire barrel portion 313 become non-uniform as illustrated in FIG. 29B. Thus, a compressed shape of the bonded portion 309 provided on the conductor 305 of the electric wire 307 also becomes non-uniform, and there is a problem that performance of a crimped portion (crimping performance of the wire barrel portion 313) deteriorates.

That is, when the wire barrel portion 313 is crimped in a state where the bonded portion 309 is fixed to be horizontally long as illustrated in FIG. 28A, it is easy to make right and left biting portions of the wire barrel portion 313 uniform as illustrated in FIG. 28B.

On the other hand, when the wire barrel portion 313 is crimped in a state where the bonded portion 309 is fixed to be vertically long as illustrated in FIG. 29A, there is a risk that right and left biting portions of the wire barrel portion 313 become non-uniform as illustrated in FIG. 29B.

When a size of the bonded portion 309 is set to such a size that the shape of the bonded portion 309 is hardly discriminated by the naked eye, the bonded portion 309 is not noticed if the state is formed as illustrated in FIG. 29A.

The invention has been made in view of the above problems, and an object of the invention is to provide a method for manufacturing a terminal-equipped electric wire in which a bonded portion is formed by bonding a part of a conductor and a wire barrel portion of a terminal is fixed to the bonded portion, the method capable of preventing non-uniform right and left biting portions of the wire barrel portion.

A method for manufacturing a terminal-equipped electric wire according to first aspect of the present invention includes forming, in an electric wire, a bonded portion in which strands of a conductor are bonded to each other in at least a part of the conductor in a longitudinal direction exposed due to absence of a sheath at a part of the electric wire in the longitudinal direction. A terminal including a wire barrel portion is fixed to the electric wire such that the wire barrel portion covers at least a part of the bonded portion. A sectional shape of the bonded portion before the fixing of the terminal is formed in such a shape that a variable range of a value of a distance between a geometric center of a cross section of the bonded portion and the wire barrel portion falls within a range of 0.71 to 1.29 when rotating the bonded portion by an arbitrary angle while engaging the bonded portion with the wire barrel portion within the wire barrel portion.

The variable range of the value of the distance may fall within a range of 0.8 to 1.2.

The sectional shape of the bonded portion before the fixing of the terminal may be formed in a circular shape or a shape approximating a circle, a regular polygonal shape having a number of corners equal to or more than a number of corners of a square, or a shape approximating a regular polygonal shape.

A cross section of the wire barrel portion of the terminal before being fixed to the bonded portion may be formed in a U-shape including an arcuate bottom plate portion whose curvature radius is equal to or slightly larger than a radius of a circle or a circumscribed circle of the bonded portion and a pair of side plate portions. The wire barrel portion may be fixed to the electric wire by crimping the wire barrel portion while bringing the bonded portion into contact with a bottommost portion of an inner surface of the bottom plate portion or vicinity of the bottommost portion, within the wire barrel portion.

The exposed conductor may be cut at an intermediate portion of the exposed conductor in the longitudinal direction.

The terminal may be fixed to the electric wire such that an end of the wire barrel portion positioned on a side of the sheath is positioned to be closer to the sheath than an end of the bonded portion positioned on the side of the sheath.

The longitudinal direction of the electric wire and a front-rear direction of the wire barrel portion may coincide with each other. The bonded portion may be positioned at an inner side of the wire barrel portion in the front-rear direction.

A terminal-equipped electric wire according to second aspect of the present invention includes a plurality of electric wires fixed to one terminal by the method for manufacturing the terminal-equipped electric wire according to the first aspect.

According to the aspects of the present invention, a method for manufacturing a terminal-equipped electric wire capable of preventing non-uniform right and left biting portions of the wire barrel portion is provided.

DETAILED DESCRIPTION

Figure 3:
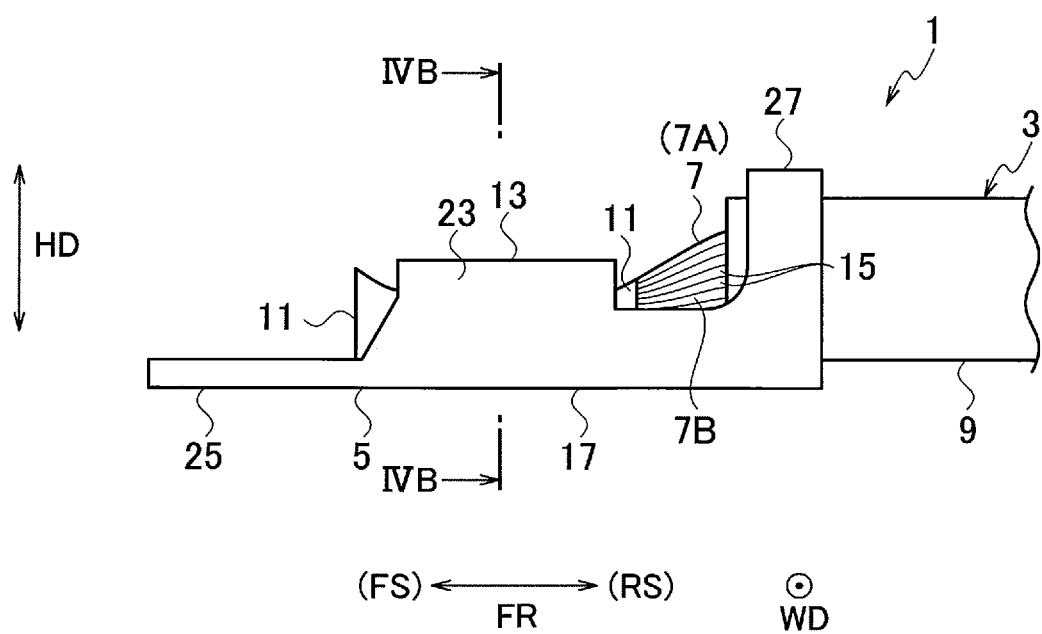
FIG. 3 is a view illustrating a terminal-equipped electric wire manufactured by the method for manufacturing a terminal-equipped electric wire according to the embodiment of the invention.

As illustrated in FIG. 3, a terminal-equipped electric wire 1 manufactured by a method for manufacturing a terminal-equipped electric wire according to an embodiment of the invention includes an electric wire 3 and a terminal (terminal fitting) 5.

For convenience of description, it is assumed that a predetermined direction of the terminal-equipped electric wire 1 is the front-rear direction, a predetermined direction orthogonal to the front-rear direction is the height direction, and a direction orthogonal to the front-rear direction and the height direction is the width direction.

The electric wire 3 includes a conductor (core wire) 7 and a sheath (insulator) 9 covering the conductor 7, and the conductor 7 is exposed at one end portion (front end portion) of the electric wire 3 in the longitudinal direction (front-rear direction). A bonded portion 11 is formed over a predetermined length in a part of the exposed conductor 7 (exposed conductor 7A).

The terminal 5 includes a wire barrel portion 13, and the wire barrel portion 13 is crimped, for example, such that the wire barrel portion 13 is integrally fixed to the bonded portion 11.

Next, the method for manufacturing the terminal-equipped electric wire 1 will be described.

The terminal-equipped electric wire 1 is manufactured through a bonded portion formation step and a terminal fixing step.

The electric wire 3 in which the conductor 7 is exposed as the sheath 9 is not present over a predetermined length at a part (for example, front end portion) in the longitudinal direction (length direction) (for example, as a part of the sheath 9 is removed) is prepared in the bonded portion formation step.

Subsequently, the bonded portion 11 is formed in at least the part (for example, the front end portion) of the exposed conductor 7 (the exposed conductor 7A) in the longitudinal direction (see FIG. 2). The bonded portion 11 is formed by ultrasonic bonding (ultrasonic treatment) of a plurality of strands 15 for the conductor 7 with each other.

Figure 1:
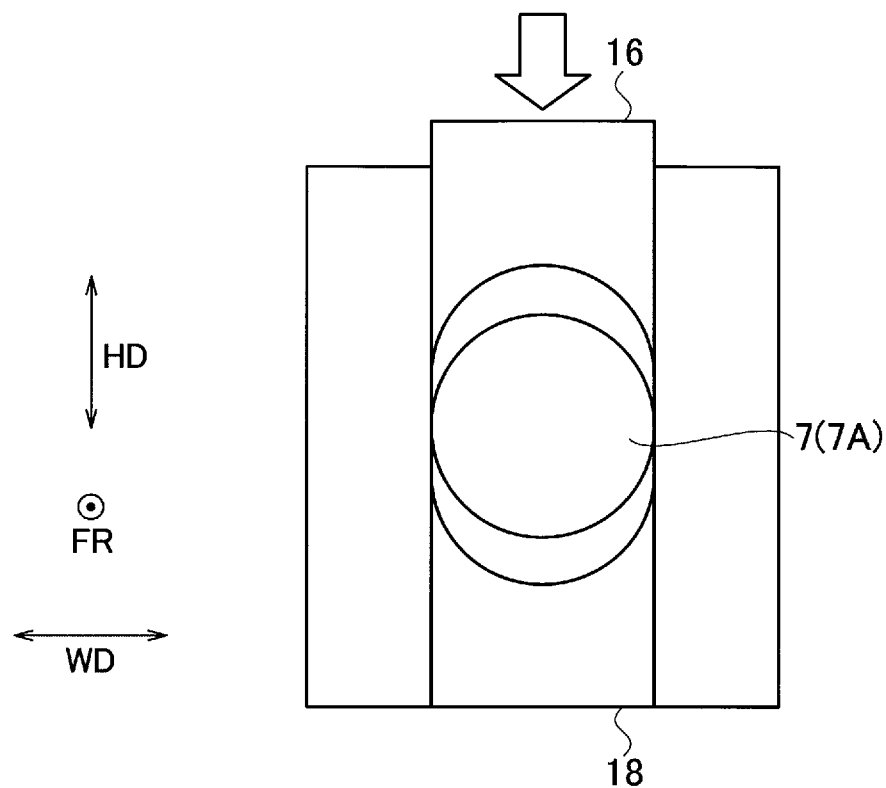
FIG. 1 is a view illustrating a bonded portion formation step in a method for manufacturing a terminal-equipped electric wire according to an embodiment of the invention.

As illustrated in FIG. 1, the conductor 7 is sandwiched between an anvil 16 and a horn 18 with a predetermined force (see an arrow in FIG. 1), and the horn 18 is ultrasonically vibrated in a direction orthogonal to the paper plane of FIG. 1. Incidentally, FIG. 1 does not illustrate the individual strands 15.

In the terminal fixing step, the terminal 5 including the wire barrel portion 13 is fixed to the electric wire 3 such that the wire barrel portion 13 wraps and covers at least a part of the bonded portion 11 formed in the bonded portion formation step.

Incidentally, a sectional shape of the bonded portion 11 (a shape of a cross section taken along a plane orthogonal to the longitudinal direction of the electric wire 3) is formed in a circular shape or a non-circular shape before the terminal 5 is fixed in the terminal fixing step formed in the bonded portion formation step (before crimping of the wire barrel portion 13).

More specifically, the sectional shape of the bonded portion 11 before crimping of the wire barrel portion 13 is formed in such a shape that a variable range of a value (a variable range of a ratio) of a distance between a geometric center 19 of a cross section of the bonded portion 11 and the wire barrel portion 13 (for example, a bottommost portion on a side opposing the bonded portion 11 of a bottom plate portion 17) falls within a predetermined range when the bonded portion 11 is brought into contact with the terminal 5 and the bonded portion 11 is rotated by an arbitrary angle with respect to the terminal 5 as illustrated in FIGS. 4A to 5B, and the like.

The above rotation of the bonded portion 11 with respect to the terminal 5 before crimping of the wire barrel portion 13 is performed while causing the bonded portion 11 to be engaged (to brought into contact or line-contact) with the bottommost portion of the bottom plate portion 17 of the wire barrel portion 13 or a portion in the vicinity thereof within the wire barrel portion 13 at one or two sites.

When the above rotation of the bonded portion 11 with respect to the terminal 5 is performed, the longitudinal direction of the bonded portion 11 and the front-rear direction of the terminal 5 coincide with each other.

In addition, the variable range of the value of the distance between the geometric center 19 of the cross section of the bonded portion 11 and the wire barrel portion 13 is set within a range of 0.71 to 1.29, preferably within a range of 0.73 to 1.27, more preferably within a range of 0.75 to 1.25, more preferably within a range of 0.77 to 1.23, more preferably within a range of 0.80 to 1.20, and still more preferably within a range of 0.82 to 1.18.

Incidentally, the above-described variable range is a value (percentage value) when an average value ((a maximum value+a minimum value)/2) of values of the distance between the geometric center 19 of the cross section of the bonded portion 11 and the wire barrel portion 13 is 1.0. Therefore, for example, when the average value is 2.0 mm and the variable range is 0.8 to 1.2, the distance is 1.6 mm (2.0 mm×0.8) to 2.4 mm (2.0 mm×1.2).

In other words, a sectional shape of the bonded portion 11 (a shape of a cross section taken along a plane orthogonal to the longitudinal direction of the electric wire 3) is formed in a predetermined shape before the terminal 5 is fixed in the terminal fixing step formed in the bonded portion formation step (before crimping of the wire barrel portion 13).

While the above predetermined shape is formed in a shape in which the distance between the geometric center 19 of the cross section of the bonded portion 11 and the wire barrel portion 13 (for example, a distance in the height direction between the geometric center 19 and a contact site between the wire barrel portion 13 and the bonded portion 11) is constant or changes when the bonded portion 11 is rotated by an arbitrary angle about an axis extending in the front-rear direction while causing the bonded portion 11 to be engaged with the wire barrel portion 13 within the wire barrel portion 13 (for example, bringing the bonded portion 11 into contact with the bottommost portion of the wire barrel portion 13 in the height direction or the vicinity of the bottommost portion).

In the case of making the above change, a range of the change is set to a range in which a maximum value of the distance in the height direction is smaller than 1.81, when assuming that a minimum value of the distance in the height direction is 1. That is, the distance between the geometric center 19 of the cross section and the wire barrel portion 13 changes within a range of 1 to 1.81.

Here, the description will be given in more detail by exemplifying a case where the sectional shape of the bonded portion 11 is a rectangular shape. It is assumed that a dimension of a short side of a rectangular of the cross section of the bonded portion 11 is 5 mm and a dimension of a long side of the rectangle is 7.5 mm. A dimension of a diagonal of the rectangle of the cross section of the bonded portion 11 is approximately 9.0 mm.

When the bonded portion 11 having the sectional shape with such dimensions is brought into contact with the terminal 5 (the wire barrel portion 13) and the bonded portion 11 is rotated by an arbitrary angle with respect to the terminal 5 (the wire barrel portion 13), the distance in the height direction between the geometric center 19 of the bonded portion 11 and the contact site between the wire barrel portion 13 and the bonded portion 11 changes within a range of 2.5 mm (5 mm/2) to 4.5 mm (9 mm/2).

As a result, the distance between the geometric center 19 of the cross-section of the bonded portion 11 and the contact site between the bonded portion 11 and the wire barrel portion 13 changes within a range of 1 (2.5 mm/2.5 mm) to 1.80 (4.5 mm/2.5 mm; ≈1.81).

The range of the above-described change may be set to preferably 1 to 1.73, more preferably 1 to 1.65, more preferably 1 to 1.57, and more preferably 1 to 1.49, and still more preferably 1 to 1.42.

In the case where the sectional shape of the bonded portion 11 is the rectangular shape, a ratio between the short side and the long side of the rectangle is 1:1.5 when the range of the above-described change is 1 to 1.81, the ratio between the short side and the long side of the rectangle is 1:1.4 when the range of the above-described change is 1 to 1.73, the ratio between the short side and the long side of the rectangle is 1:1.3 when the range of the above-described change is 1 to 1.65, the ratio between the short side and the long side of the rectangle is 1:1.2 when the range of change is 1 to 1.57, the ratio between the short side and the long side of the rectangle is 1:1.1 when the range of the above-described change is 1 to 1.49, and the ratio of the short side to the long side becomes 1:1 to form a square when the range of the above-described change is from 1 to 1.42.

Next, the further description will be given by exemplifying a case where the shape of the cross section of the bonded portion 11 is a circle with reference to FIGS. 4A, 5A, and 5B.

Figure 4A:
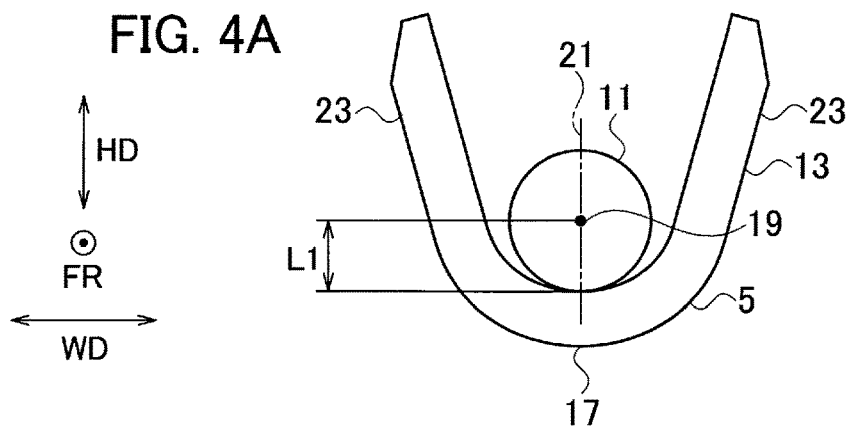
FIG. 4A is a view illustrating a state before crimping a wire barrel portion of a terminal in a terminal fixing step of the method for manufacturing a terminal-equipped electric wire according to the embodiment of the invention.
Figure 5A:
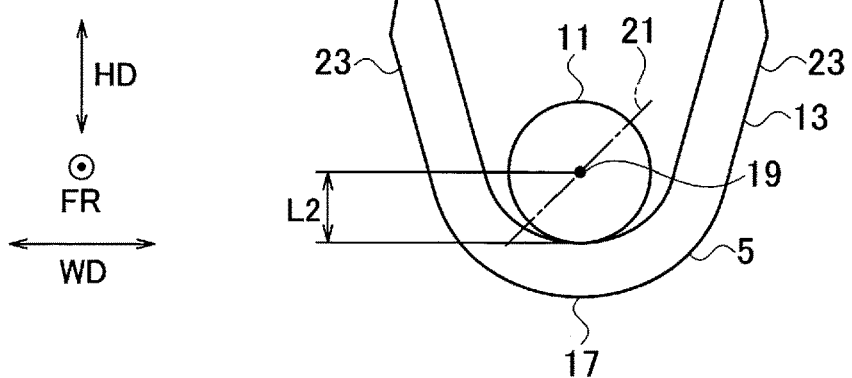
FIG. 5A is a view illustrating a state before crimping the wire barrel portion of the terminal in the terminal fixing step of the method for manufacturing a terminal-equipped electric wire according to the embodiment of the invention, the views corresponding to FIG. 4A.
Figure 5B:
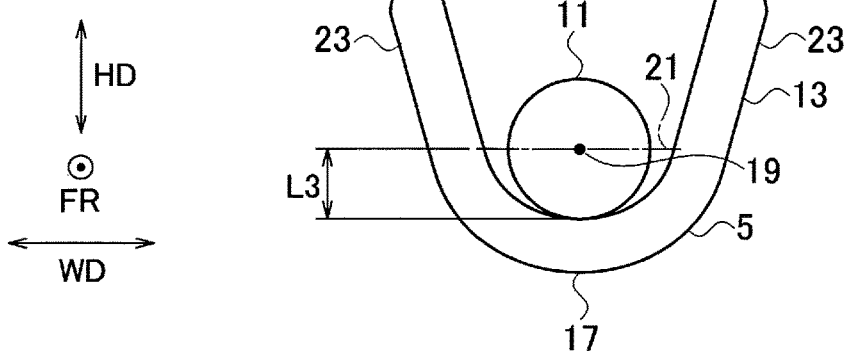
FIG. 5B is a view illustrating a state before crimping the wire barrel portion of the terminal in the terminal fixing step of the method for manufacturing a terminal-equipped electric wire according to the embodiment of the invention, the views corresponding to FIG. 4A.

In FIGS. 4A, 5A, and 5B, a reference sign 21 is an imaginary line for indicating a rotation angle of the bonded portion 11. The imaginary line 21 extends in the height direction in the state illustrated in FIG. 4A. In the state illustrated in FIG. 5A, the bonded portion 11 rotates clockwise by approximately 45° from the state illustrated in FIG. 4A. In the state illustrated in FIG. 5B, the bonded portion 11 rotates clockwise by approximately 90° from the state illustrated in FIG. 4A.

A distance L1 between the geometric center 19 of the bonded portion 11 and a portion of the wire barrel portion 13 in contact with the bonded portion 11 in the state illustrated in FIG. 4A is equal to a distance L2 illustrated in FIG. 5A and is also equal to a distance L3 illustrated in FIG. 5B.

As a result, there is no change in the value of the distance between the geometric center 19 of the cross section of the bonded portion 11 and the wire barrel portion 13, and the above-described variable range naturally falls within the range of 0.8 to 1.2.

When the shape of the cross section of the bonded portion 11 is formed in the non-circular shape, a range of 0.98 to 1.02 or a range of 0.96 to 1.04 may be excluded from the range of the change described above. When the minimum value is set to 1 as described above, a range of 1 to 1.04 where the maximum value is 1.04 may be excluded, or a range of 1 to 1.08 may be excluded.

Further, when the wire barrel portion 13 is crimped and fixed to the bonded portion 11, the sectional shape of the bonded portion 11 before crimping of the wire barrel portion 13 is formed in the above-described circular shape or non-circular shape in order to prevent a pair of side plate portions 23 of the wire barrel portion 13 from biting into the bonded portion 11 in an unbalanced state (in order to cause the pair of side plate portions 23 to bite into the bonded portion 11 approximately uniformly to the left and right) regardless of the rotation angle of the bonded portion 11.

In the terminal-equipped electric wire 1, the longitudinal direction of the electric wire 3 and the conductor 7 and the front-rear direction of the terminal 5 coincide with each other, and further, one end of the electric wire 3 in the longitudinal direction is positioned on the front side, and the other end of the electric wire 3 in the longitudinal direction is positioned on the rear side.

A cross section (cross section taken along a plane orthogonal to the front-rear direction) of the wire barrel portion 13 of the terminal 5 before being crimped is formed in a "U" shape including the bottom plate portion 17 and the pair of side plate portions 23 described above.

As illustrated in FIG. 4A and the like, a cross section of the bottom plate portion 17 is formed in an arc shape, for example, whose thickness direction is a substantially height direction and whose curvature radius of an inner surface (a surface in contact with the bonded portion 11) is equal to or slightly larger than a radius of a circle or a circumscribed circle of the bonded portion 11 (a non-circular circumscribed circle in the case where the bonded portion 11 has the non-circular shape).

The pair of side plate portions 23 is erected obliquely upward, respectively, from both ends of the bottom plate portion 17 in the width direction. A dimensional value of a portion between the pair of side plate portions 23 gradually increases from the lower side to the upper side.

The fixing of the wire barrel portion 13 in the terminal fixing step is performed by crimping the wire barrel portion 13 while bringing the bonded portion 11 into contact with the bottommost portion of an inner surface of the bottom plate portion 17 (the inner surface bottommost portion of the bottom plate portion 17) or the vicinity thereof within the wire barrel portion 13 (within the "U" shape). Almost the entire inner surface of a cylinder of the wire barrel portion 13 is brought into contact with the bonded portion 11 with a biasing force by the crimping.

Meanwhile, the strand 15 of the conductor 7 of the electric wire 3 is formed in an elongated cylindrical shape with metal such as copper, aluminum, and an aluminum alloy. The conductor 7 is configured in a form in which the plurality of strands 15 is twisted or a form in which the plurality of strands 15 collectively extends in a straight line.

Further, the electric wire 3 has flexibility. In addition, a cross section of a portion of the electric wire 3 where the sheath 9 is present (the cross section taken along a plane orthogonal to the longitudinal direction) is formed in a predetermined shape such as a circular shape.

A cross section of the conductor 7 at the portion of the electric wire 3 where the sheath 9 is present is formed in a substantially circular shape by bundling the plurality of strands 15 with almost no gap. A cross section of the sheath 9 at the portion of the electric wire 3 where the sheath 9 is present is formed in an annular shape having a predetermined width (thickness). The entire inner circumference of the sheath 9 is in contact with the entire outer circumference of the conductor 7.

Although the bonded portion 11 is formed by bonding the strands to each other by ultrasonic bonding in the above description, the bonded portion 11 may be formed by bonding the strands 15 to each other by a bonding means other than the ultrasonic bonding. For example, the bonded portion 11 may be formed in the same manner as in the case of ultrasonic bonding by metallurgically bonding the strands to each other at a temperature equal to or lower than a recrystallization temperature of the strand 15.

Further, the bonded portion 11 may be formed by treatment such as cold welding, friction stir welding, friction welding, electromagnetic welding, diffusion bonding, brazing, soldering, resistance welding, electron beam welding, laser welding, and light beam welding other than the ultrasonic treatment.

Figure 2:
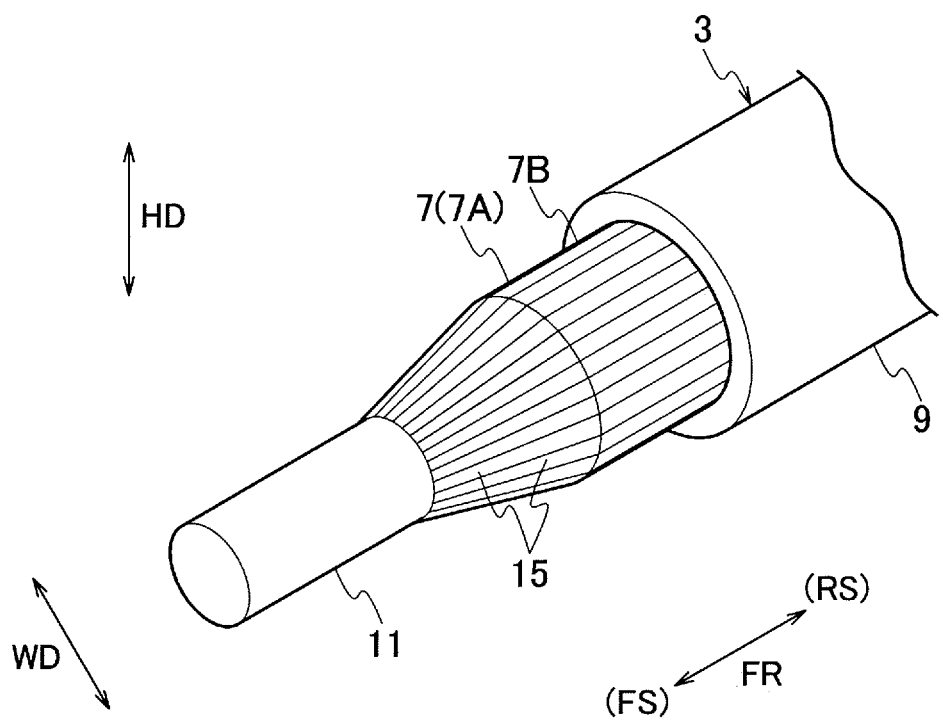
FIG. 2 is a perspective view illustrating an electric wire in which a bonded portion is formed in the bonded portion formation step in the method for manufacturing the terminal-equipped electric wire according to the embodiment of the invention.

Meanwhile, the bonded portion 11 and the sheath 9 are apart from each other by a predetermined length, for example, in the longitudinal direction of the electric wire 3 as illustrated in FIG. 2 and the like. As a result, a plurality of the strands 15 (a conductor 7B in a non-bonded state), which is in contact with each other but is in a non-bonded state, is exposed between the bonded portion 11 and the sheath 9.

That is, the bonded portion 11 having the predetermined length, the conductor 7B in the non-bonded state, the conductor 7 covered with the sheath 9 (a portion of the electric wire 3 where the sheath 9 is present) are arranged in this order from one end to the other end in the longitudinal direction of the electric wire 3.

Next, a description will be given by exemplifying the case where the sectional shape (shape of the cross section taken along the plane orthogonal to the longitudinal direction of the electric wire 3) of the bonded portion 11 before crimping of the wire barrel portion 13 is the non-circular shape. In this case, examples of the sectional shape of the bonded portion 11 may include a regular polygonal shape having five or more corners or a shape approximating a regular polygon or a shape approximating a circle other than the above-described rectangular shape and square shape.

First, a description will be given regarding a case where the sectional shape of the bonded portion 11 is formed in a regular hexagon or regular octagon as the case where the sectional shape of the bonded portion 11 is formed in the regular polygonal shape such as a square with five or more corners.

Figure 6A:
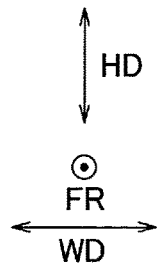
FIG. 6A is a view illustrating a bonded portion formation step according to a first modification.
Figure 6A:
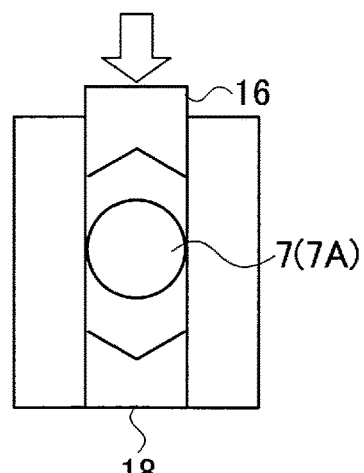
Figure 6B:
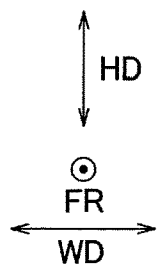
FIG. 6B is a view illustrating a bonded portion formation step according to a first modification.
Figure 6B:
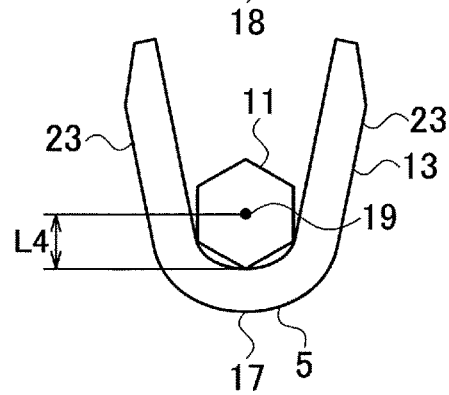

In FIGS. 6A and 6B, the sectional shape of the bonded portion 11 formed by the anvil 16 and the horn 18 is the regular hexagon. Even in the case illustrated in FIGS. 6A and 6B, a variable range of a value of a distance L4 between the geometric center 19 of the cross section of the bonded portion 11 and the wire barrel portion 13 falls within the range of 0.8 to 1.2.

Figure 7A:
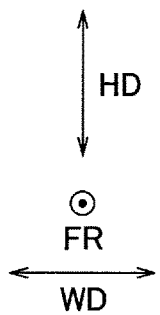
FIG. 7A is a view illustrating a bonded portion formation step according to a second modification.
Figure 7A:
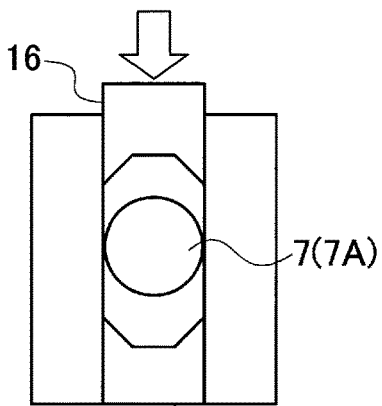
Figure 7B:
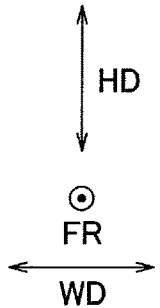
FIG. 7B is a view illustrating a bonded portion formation step according to a second modification.
Figure 7B:
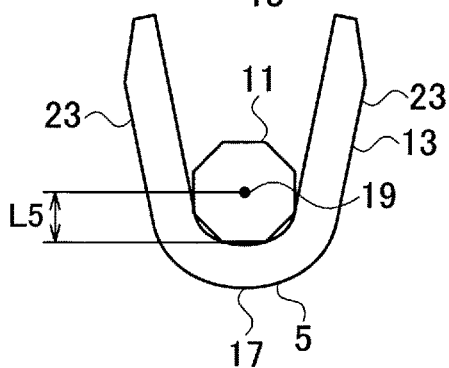

In FIGS. 7A and 7B, the sectional shape of the bonded portion 11 formed by the anvil 16 and the horn 18 is the regular octagon. Even in the case illustrated in FIGS. 7A and 7B, a variable range of a value of a distance L5 between the geometric center 19 of the cross section of the bonded portion 11 and the wire barrel portion 13 falls within the range of 0.8 to 1.2.

In addition, the sectional shape of the bonded portion 11 may be not only the regular polygon but also a shape approximating the regular polygon. In the shape approximating the regular polygon, it is assumed that a ratio of a length of each side is set within a range of 0.7 to 1.3 (more preferably 0.8 to 1.2, and still more preferably 0.9 to 1.1).

Further, at least one side may be a curve such as a circular arc in the regular polygon or the shape approximating the regular polygon. Examples of this case can include a thick biconvex lens shape. Further, each corner may be rounded in an arc shape.

Next, a case where the sectional shape of the bonded portion 11 is formed in a shape approximating a circle will be described.

Examples of the shape approximating the circle include an elliptical shape and a biconvex lens shape (lemon shape).

Figure 8A:
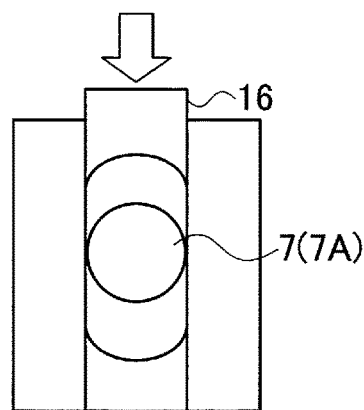
FIG. 8A is a view illustrating a bonded portion formation step according to a third modification.
Figure 8B:
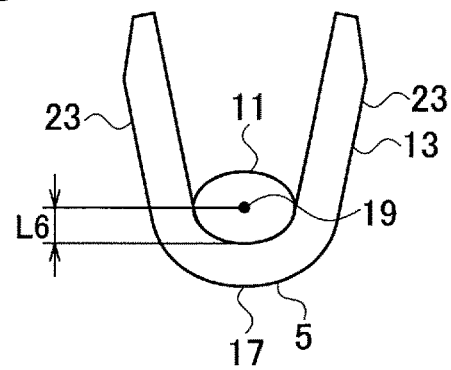
FIG. 8B is a view illustrating a bonded portion formation step according to a third modification.

In FIGS. 8A and 8B, the sectional shape of the bonded portion 11 formed by the anvil 16 and the horn 18 is formed in the elliptical shape. In this elliptical shape, for example, a value of a short side relative to a long side is 0.7 or more and less than 1.0 (more preferably 0.8 or more and less than 1.0, and still preferably 0.9 or more and less than 1.0).

Even in the case illustrated in FIGS. 8A and 8B, a variable range of a value of a distance L6 between the geometric center 19 of the cross section of the bonded portion 11 and the wire barrel portion 13 falls within the range of 0.8 to 1.2.

Figure 9A:
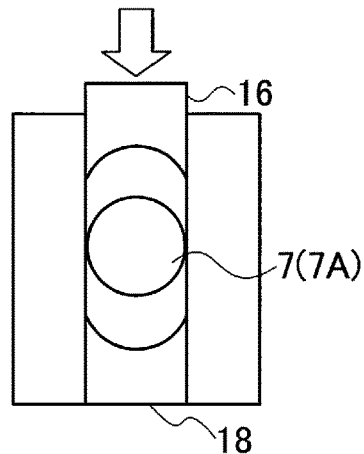
FIG. 9A is a view illustrating a bonded portion formation step according to a fourth modification.
Figure 9B:
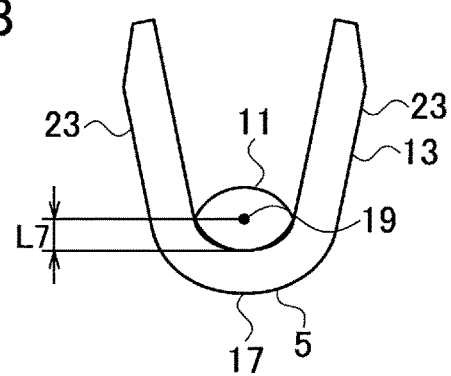
FIG. 9B is a view illustrating a bonded portion formation step according to a fourth modification.

In FIGS. 9A and 9B, the sectional shape of the bonded portion 11 formed by the anvil 16 and the horn 18 is formed in the biconvex lens shape. Even in this biconvex lens shape, for example, a value of a short side divided by a long side is 0.7 or more and less than 1.0 (more preferably 0.8 or more and less than 1.0, and still preferably 0.9 or more and less than 1.0).

The biconvex lens shape is a sectional shape of a biconvex lens taken along a plane including an optical axis, and in this case, a value of the short side is a half of a value of a thickness of the biconvex lens, and a value of the long side is a half of a value of an outer diameter of the biconvex lens. Although an outer circumference (outer circumference when viewed in an extension direction of the optical axis) of the lens has a cylindrical side surface with a low height in an actual biconvex lens (for example, a thick biconvex lens), the invention is not necessarily limited thereto. That is, the biconvex lens may have a shape of a portion where two spheres cross each other as illustrated in FIG. 9B.

Even in the case illustrated in FIGS. 9A and 9B, a variable range of a value of a distance L7 between the geometric center 19 of the cross section of the bonded portion 11 and the wire barrel portion 13 falls within the range of 0.8 to 1.2.

Here, the terminal 5 will be described in more detail.

The terminal 5 is formed, for example, by forming a flat metal material having a constant thickness into a predetermined shape, and then, appropriately bending the material formed in the predetermined shape. Therefore, a thickness of a wall in almost the entire portion of the terminal 5 is constant.

The terminal 5 has, for example, a mating terminal connection portion 25 to be connected to a mating terminal, the wire barrel portion 13, and an insulation barrel portion 27 arranged in this order from the front side to the rear side as illustrated in FIG. 3 and the like.

A cross section (cross section taken along the plane orthogonal to the front-rear direction) of the insulation barrel portion 27 before being crimped is also formed in the "U" shape similar to the cross section of the wire barrel portion 13.

In the terminal-equipped electric wire 1, the bonded portion 11 and the wire barrel portion 13 are integrated as the wire barrel portion 13 is crimped, and the sheath 9 and the insulation barrel portion 27 are integrated as the insulation barrel portion 27 is crimped.

Figure 4B:
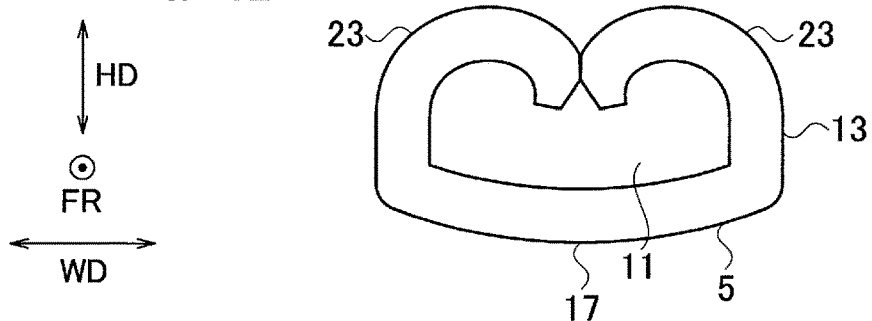
FIG. 4B is a view illustrating a state where the crimping of the wire barrel portion in the terminal fixing step has been completed, the view illustrating a cross section taken along line IVB-IVB illustrated in FIG. 3.

The crimping of the wire barrel portion 13 or the insulation barrel portion 27 is mainly performed as the pair of side plate portions 23 is plastically deformed so that the wire barrel portion 13 and the insulation barrel portion are formed in a tubular shape. When the wire barrel portion 13 is crimped, the bonded portion 11 is slightly deformed. Further, when the wire barrel portion 13 is crimped, distal end portions of the pair of side plate portions 23 of the wire barrel portion 13 bite into the bonded portion 11 as illustrated in FIG. 4B.

According to the terminal-equipped electric wire 1, the sectional shape of the bonded portion 11 is formed in the circular shape or the above-described non-circular shape (for example, the regular polygonal shape), and thus, the form of the outer circumference of the bonded portion 11 hardly changes even if the bonded portion 11 rotates with respect to the terminal 5 about the central axis of the bonded portion 11 (the central axis extending in the front-rear direction including the geometric center 19). As a result, the left and right side plate portions 23 of the wire barrel portion 13 uniformly bite into the bonded portion 11 when the wire barrel portion 13 is crimped.

Further, a compressed form of the bonded portion 11 of the conductor 7 of the electric wire 3 also becomes uniform, deterioration of performance of a crimped portion (crimping performance of the wire barrel portion 13) is suppressed, and the degree of mechanical bonding and the degree of electrical bonding between the electric wire 3 (the conductor 7) and the terminal 5 (the wire barrel portion 13) are stabilized.

Further, according to the terminal-equipped electric wire 1, the curvature radius of the inner surface of the bottom plate portion 17 of the wire barrel portion 13 is formed in the arc shape to be equal to or slightly larger than the radius of the circle or the circumscribed circle of the bonded portion 11, and the fixing of the wire barrel portion 13 in the terminal fixing step is performed by crimping the wire barrel portion 13 while bringing the bonded portion 11 into contact with the bottommost portion of the inner surface of the bottom plate portion 17 or the vicinity thereof, and thus, it is possible to even more reliably cause the pair of side plate portions 23 of the wire barrel portion 13 to bite into the bonded portion 11.

Meanwhile, the exposed conductor 7A may be cut to an appropriate predetermined length at an intermediate portion in the longitudinal direction of the exposed conductor 7A in the bonded portion formation step.

Figure 10:
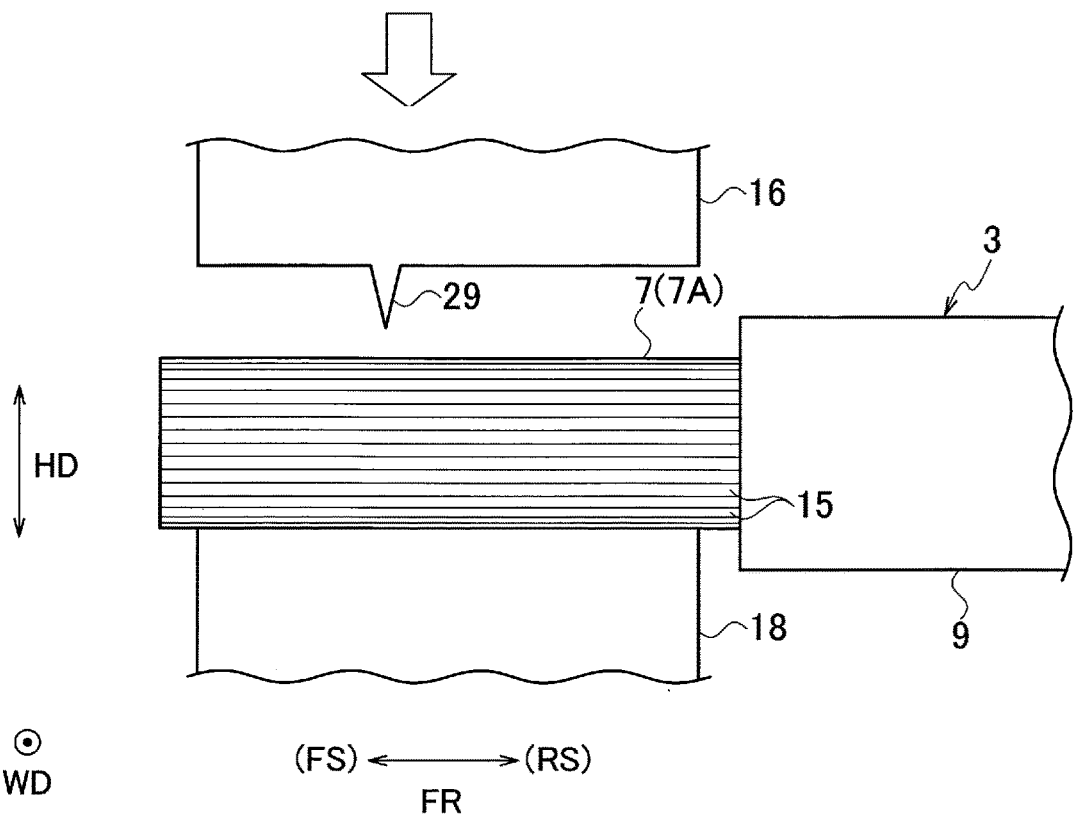
FIG. 10 is a view illustrating a bonded portion formation step according to a fifth modification.
Figure 11:
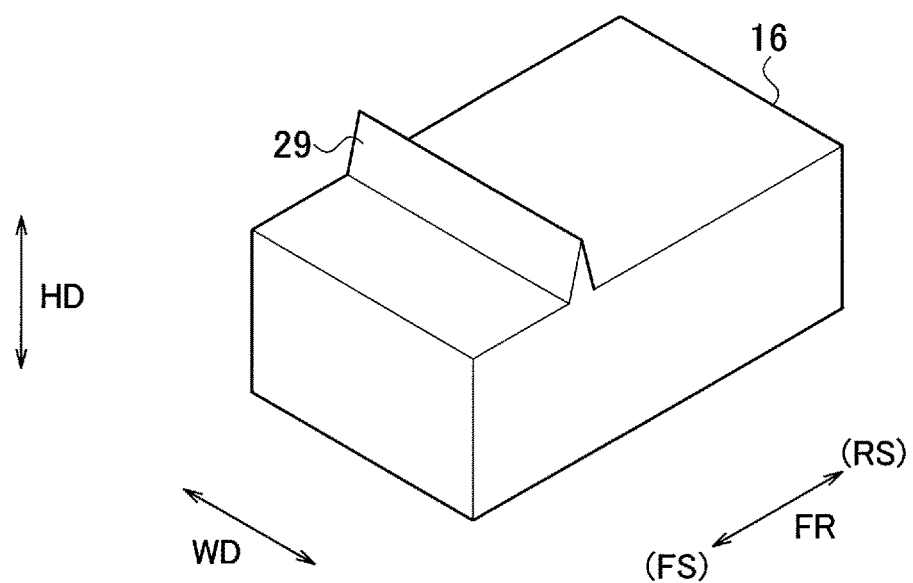
FIG. 11 is a perspective view of an anvil to be used in the bonded portion formation step according to the fifth modification.
Figure 12:
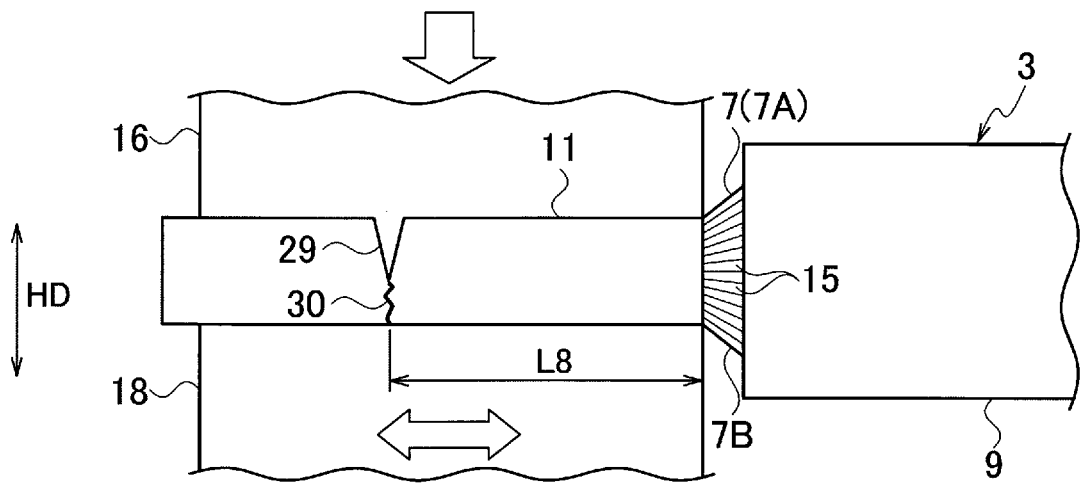
FIG. 12 is a view illustrating the bonded portion formation step according to the fifth modification.
Figure 13:
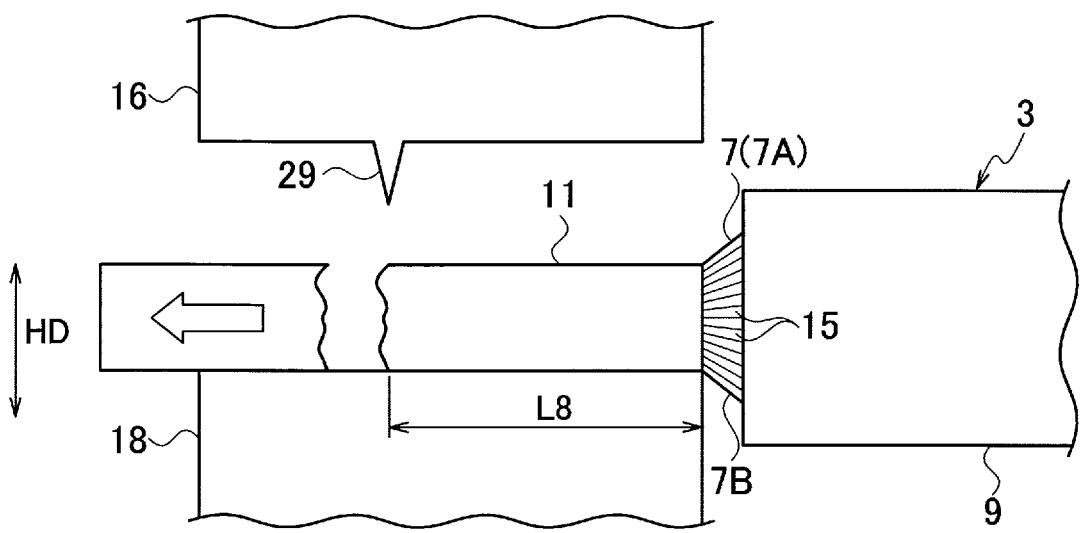
FIG. 13 is a view illustrating the bonded portion formation step according to the fifth modification.

That is, a blade portion (protrusion) 29 is provided on the anvil 16 as illustrated in FIGS. 10 and 11, and the conductor 7 may be cut at the time of moving the anvil 16 toward the horn 18 to sandwich the conductor 7 in the bonded portion formation step or the like as illustrated in FIGS. 12 and 13.

The bonded portion 11 has a constant length L8 by the above-described cutting. A value of the length L8 is a value necessary to fix the wire barrel portion 13 by crimping.

In the state before the conductor 7 is sandwiched by the anvil 16 and the horn 18 as illustrated in FIG. 10, the exposed conductor 7A is positioned between the anvil 16 and the horn 18, and the anvil 16 (the blade portion 29) is separated from the exposed conductor 7A. The horn 18 is not ultrasonically vibrated but may be ultrasonically vibrated.

When the anvil 16 is moved in a direction indicated by the arrow from the state illustrated in FIG. 10 to approach the horn 18, the blade portion 29 of the anvil 16 bites into the exposed conductor 7A, and the sandwiching of the exposed conductor 7A by the anvil 16 and the horn 18 ends as illustrated in FIG. 12. At this time, a crack 30 extending in the height direction from a distal end of the blade portion 29 to the horn 18 is formed in the exposed conductor 7A.

When the horn 18 is ultrasonically vibrated in the direction indicated by the arrow in FIG. 12 in this state, the bonded portion 11 is formed in a portion of the conductor 7 at a site indicated by the length L8 in FIG. 12.

When the anvil 16 is moved in a direction away from the bonded portion 11 after the bonded portion 11 is formed in the state illustrated in FIG. 12, a conductor (bonded conductor) on the left side of the crack 30 is separated from the electric wire 3 used as the terminal-equipped electric wire 1 as illustrated in FIG. 13.

In addition, the blade portion 29 illustrated in FIGS. 10 to 13 is double-edged, and has an isosceles triangular shape with a small apex angle (about 5° to 15°) when viewed from the width direction and protrudes from the flat surface of the anvil 16 toward the horn 18 such that the apex angle becomes a protruding end (distal end). Further, the blade portion 29 is provided on the anvil 16 over the entire width in the width direction.

Meanwhile, the shape of the blade portion 29 may be appropriately changed as illustrated in FIGS. 14A to 14D.

Figure 14A:
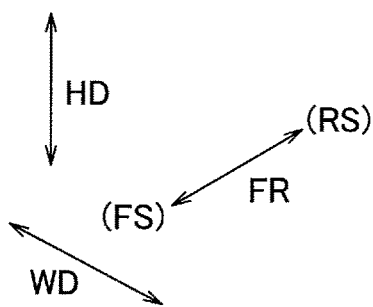
FIG. 14A is a perspective view illustrating a modification of the anvil to be used in the bonded portion formation step according to the fifth modification.
Figure 14A:
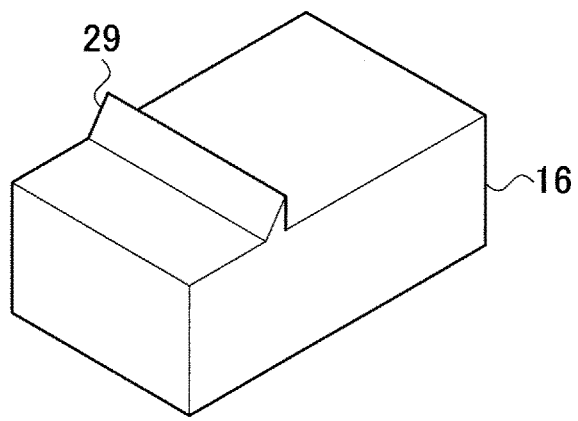

For example, the blade portion 29 may be formed with a single edged blade as illustrated in FIG. 14A. When the blade portion 29 illustrated in FIG. 14A is viewed from the width direction, a right triangle shape with one small angle (about 5° to 15°) is formed so as to protrude from the flat surface of the anvil 16 toward the horn 18 such that the one small angle becomes a protruding end (distal end) and one side orthogonal to the flat surface of the anvil 16 is positioned on the rear side. Even in this case, the blade portion 29 is provided on the anvil 16 over the entire width in the width direction.

Figure 14B:
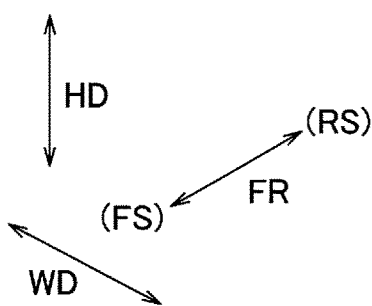
FIG. 14B is a perspective view illustrating a modification of the anvil to be used in the bonded portion formation step according to the fifth modification.
Figure 14B:
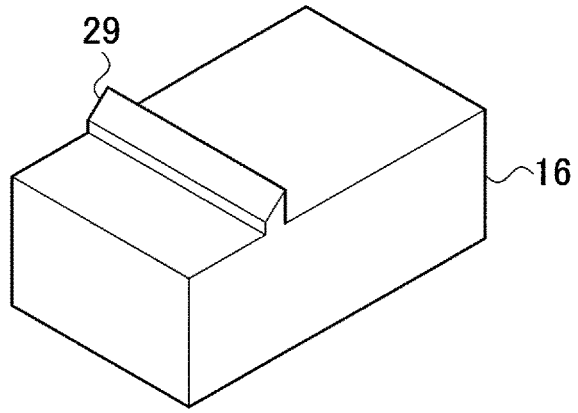

As illustrated in FIG. 14B, the blade portion 29 may be formed with a single edged blade and a proximal end portion of the blade portion 29 may have a thickness (dimension in the front-rear direction may be made constant at the proximal end portion of the blade portion 29), which is similar to the case illustrated in FIG. 14A.

When the blade portion 29 illustrated in FIG. 14B is viewed from the width direction, a trapezoidal shape is formed such that one oblique side is orthogonal to an upper base and a lower base and the other oblique side intersects with the lower base at a small intersection angle (intersection angle of about 5° to 15°). Then, the blade portion 29 protrudes from the flat surface of the anvil 16 toward the horn 18 such that an angle having the small intersection angle becomes a protruding end (distal end) and one oblique side orthogonal to the upper base and the lower base is positioned on the rear side. Even in this case, the blade portion 29 is provided on the anvil 16 over the entire width in the width direction.

In the case illustrated in FIG. 14A, the proximal end portion of the blade portion 29 may have a thickness as illustrated in FIG. 14B.

Figure 14C:
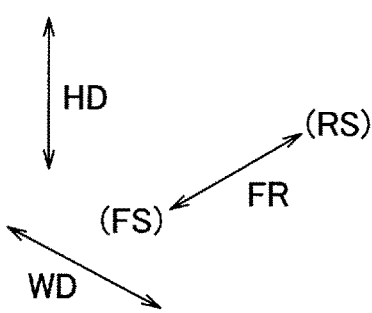
FIG. 14C is a perspective view illustrating a modification of the anvil to be used in the bonded portion formation step according to the fifth modification.
Figure 14C:
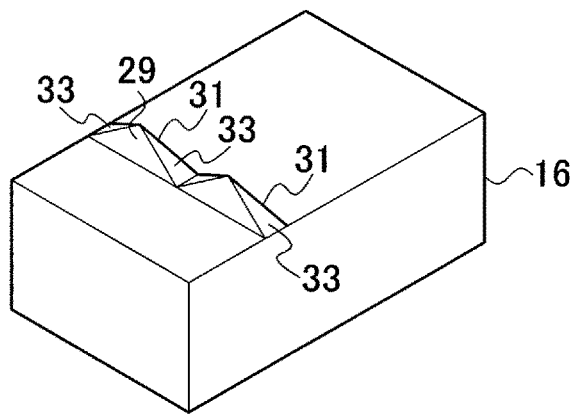

In a mode illustrated in FIG. 14C, the blade portion 29 is formed of a plurality of (for example, two) quadrangular pyramidal protrusions 31, and the respective quadrangular pyramidal protrusions 31 are arranged in a line in the width direction of the anvil 16. A bottom surface of the quadrangular pyramid is formed in a rectangular shape having a large dimension in the lateral direction (width direction in the anvil 16) and a small dimension in longitudinal direction (front-rear direction in the anvil 16).

The mode illustrated in FIG. 14C may be grasped as one in which a plurality of notches 33 is provided in the blade portion 29 of a mode illustrated in FIG. 11. The notches 33 extend from the distal end to the proximal end (the flat surface of the anvil 16) of the blade portion 29 in the height direction.

Figure 14D:
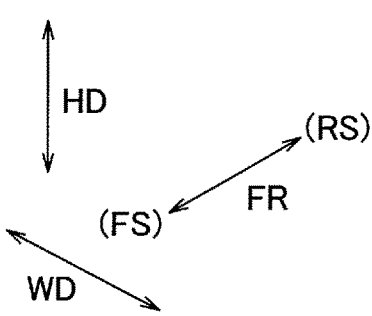
FIG. 14D is a perspective view illustrating a modification of the anvil to be used in the bonded portion formation step according to the fifth modification.
Figure 14D:
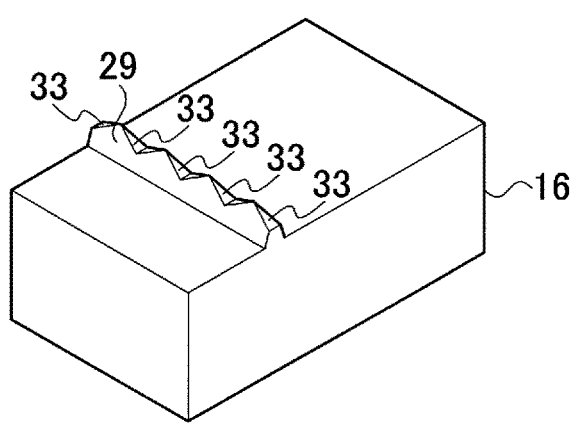

In a mode illustrated in FIG. 14D, the plurality of notches 33 is provided in the blade portion 29 of the mode illustrated in FIG. 11 in a manner similar to that of the mode illustrated in FIG. 14C. However, in the mode illustrated in FIG. 14D, in the height direction, the notch 33 is provided only from the distal end of the blade portion 29 to the intermediate portion of the blade portion 29, and does not reach the proximal end (the flat surface of the anvil 16).

In the mode illustrated in FIG. 14C or 14D, a protruding height of the blade portion 29 periodically changes in the width direction of the anvil 16 (the distal end of the blade portion 29 is jagged) so that conductor 7 is more accurately cut.

Incidentally, a notch similar to the notch 33 may be formed in the blade portion 29 of the mode illustrated in FIG. 14A or 14B.

Figure 15:
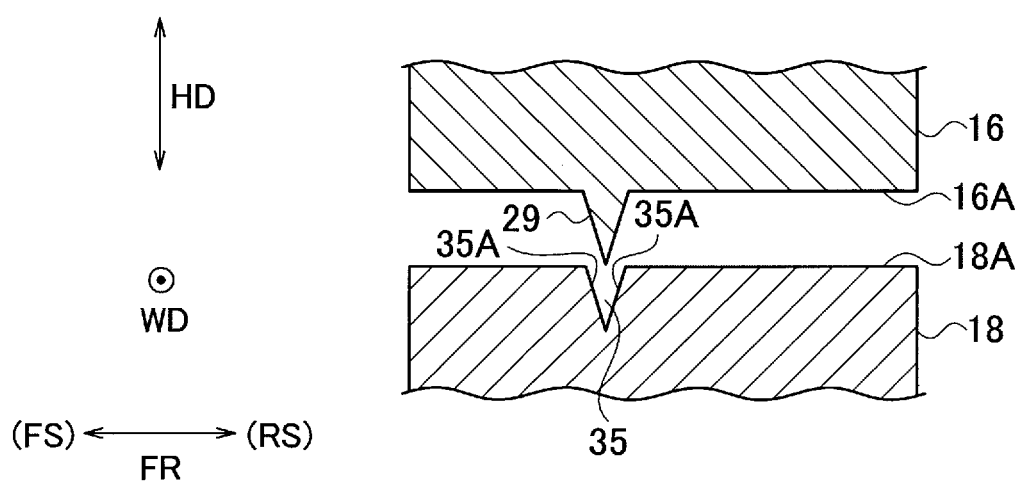
FIG. 15 is a view illustrating a modification of the anvil and a horn to be used in the bonded portion formation step according to the fifth modification.

Further, a concave portion 35 may be provided in the horn 18 as illustrated in FIG. 15 in addition to providing the blade portion 29 on the anvil 16. When the concave portion 35 is provided, it is possible to prevent the blade portion 29 from interfering with the horn 18 even if the protruding height of the blade portion 29 is increased.

That is, even if a value of the protruding height of the blade portion 29 is made larger than a value of an outer diameter of the conductor 7 so that the entire diameter of the conductor 7 is cut by the blade portion 29 when forming the bonded portion 11, the distal end portion of the blade portion 29 enters the concave portion 35 and does not interfere with the horn 18.

More specifically, even if a surface 16A of the anvil 16 opposing the horn 18 is brought into contact with a surface 18A of the horn 18 opposing the anvil 16, a gap is formed between a wall surface 35A of the concave portion 35 and the blade portion 29. Further, the above gap causes the blade portion 29 and the wall surface of the concave portion 35 not to interfere with each other even if the horn 18 is ultrasonically vibrated.

When the blade portion 29 is provided on the anvil 16, the length L8 of the conductor 7 to be ultrasonically bonded by the anvil 16 and the horn 18 becomes constant, and the shape of the bonded portion 11 is stabilized.

Figure 30A:
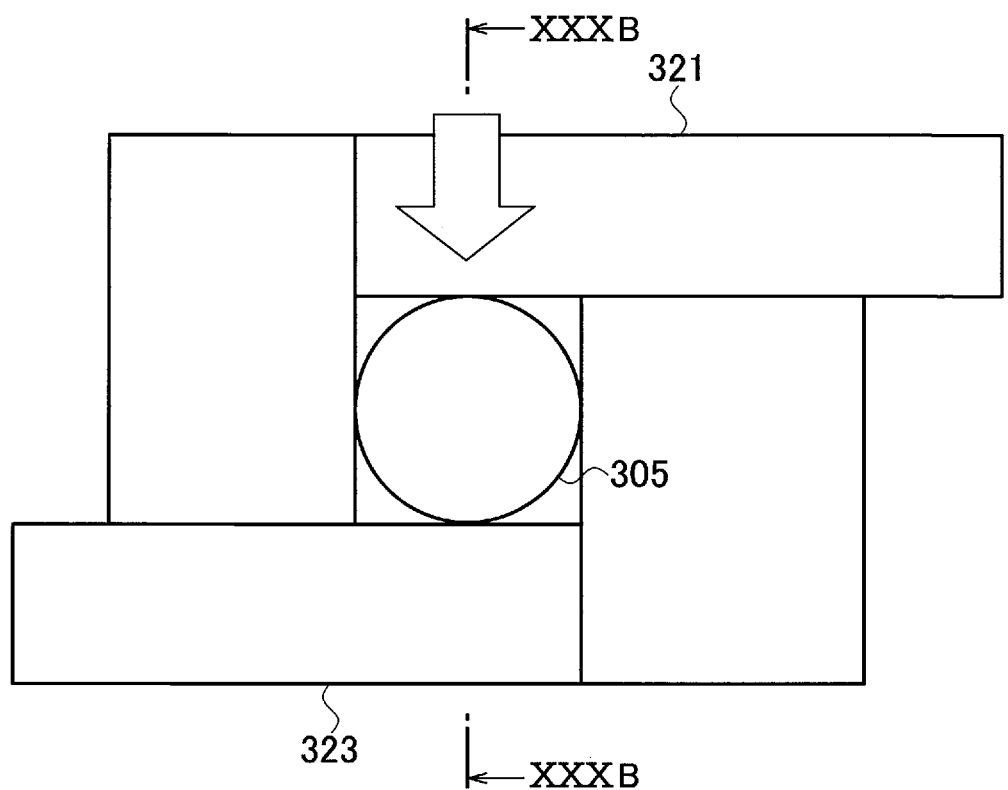
FIG. 30A is a view illustrating a conventional ultrasonic bonding method.
Figure 30B:
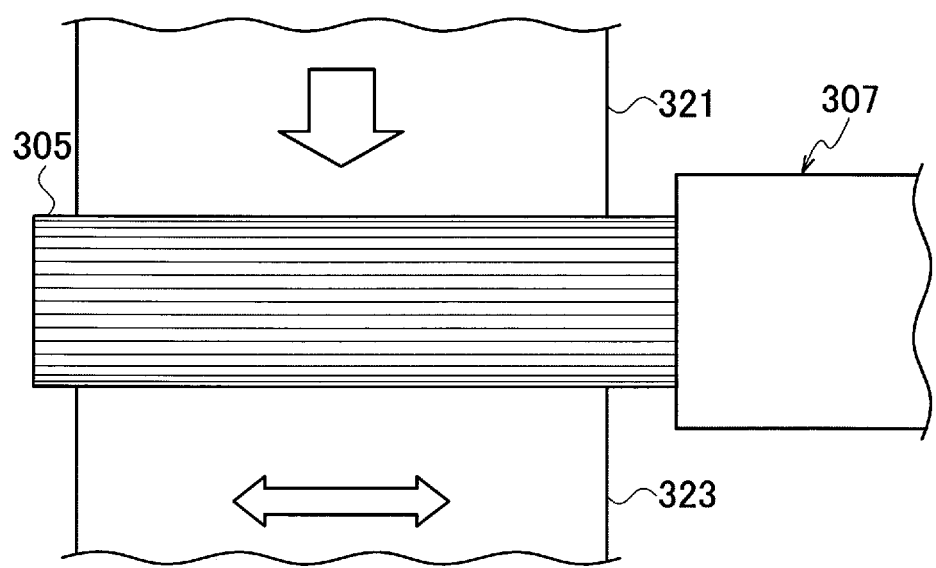
FIG. 30B is a cross sectional view taken along line XXXB-XXXB in FIG. 30A.

That is, when a conductor 305 is ultrasonically bonded using an anvil 321 and a horn 323 as illustrated in FIGS. 30A and 30B, an exposed conductor is assumed to extend from both ends of the anvil 321 and the horn 323 such that a length of an exposed conductor of an electric wire 307 is longer than a length of the anvil 321 or the horn 323. Then, the pressure (force per unit area) received by the conductor 305 does not change so that a shape of a bonded portion is stabilized even if a position of the electric wire 307 relative to the anvil 321 or the horn 323 (a position in the left-right direction in FIG. 30B) slightly changes.

On the other hand, in a mode in which the exposed conductor extends only from one end of the anvil 321 or the horn 323 when the conductor 305 is ultrasonically bonded using the anvil 321 and the horn 323 as illustrated in FIGS. 31A to 32B, a length of the conductor 305 sandwiched between the anvil 321 and the horn 323 during ultrasonic bonding changes so that a shape of a bonded portion 309 changes if a position of the electric wire 307 with respect to the anvil 321 or the horn 323 (a position in the left-right direction in FIGS. 31B and 32B) changes.

Figure 31A:
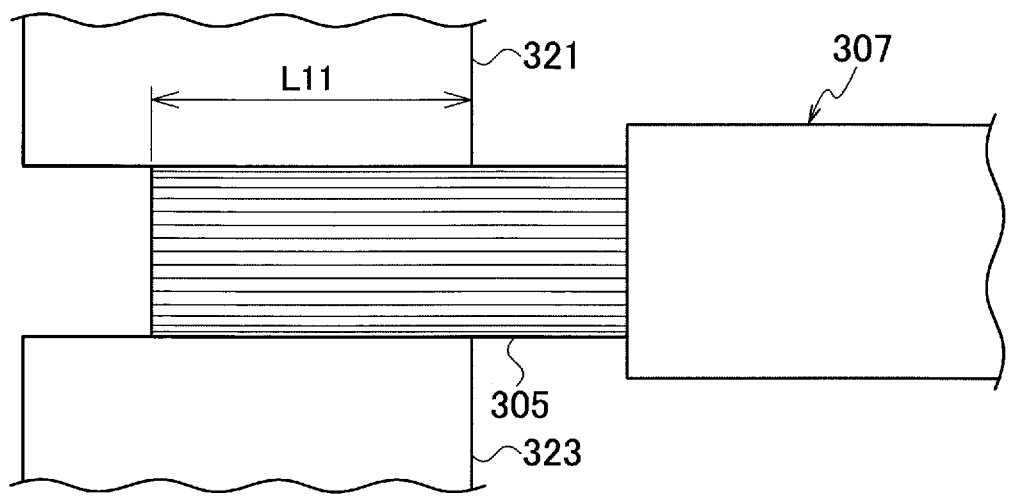
FIG. 31A is a view illustrating an ultrasonic bonding method.
Figure 31B:
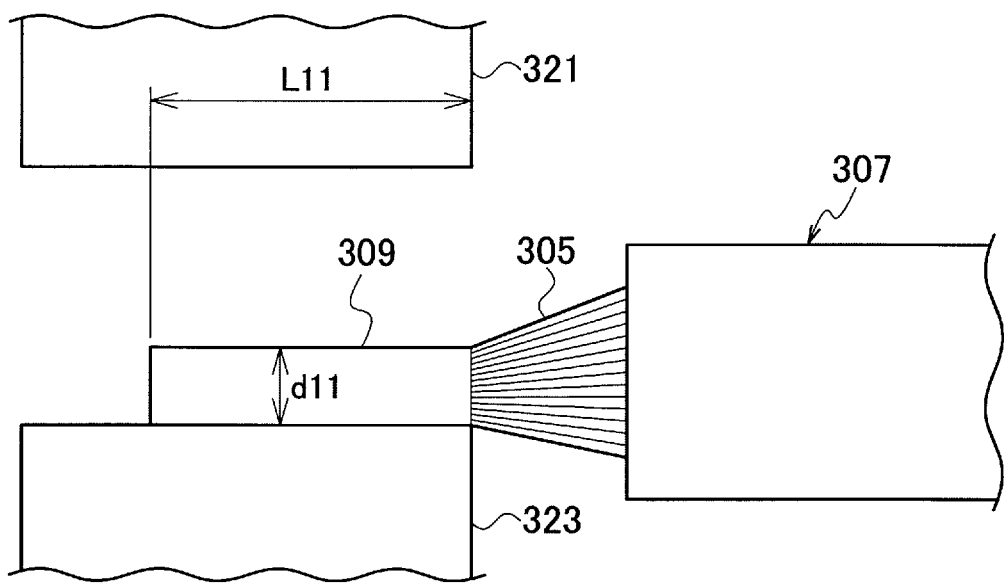
FIG. 31B is a view illustrating an ultrasonic bonding method.
Figure 32A:
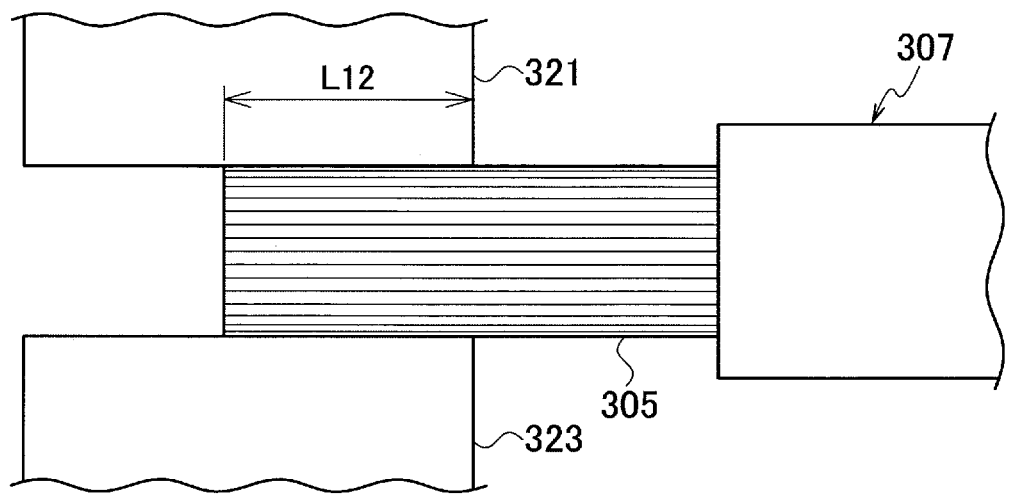
FIG. 32A is a view illustrating the ultrasonic bonding method.
Figure 32B:
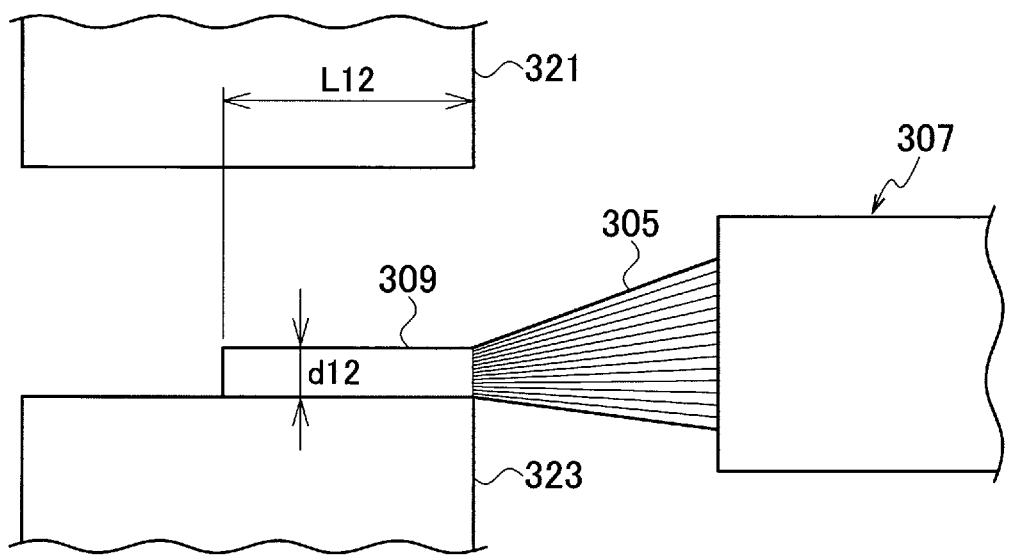
FIG. 32B is a view illustrating the ultrasonic bonding method.

That is, when it is assumed that a length of the conductor 305 sandwiched between the anvil 321 and the horn 323 during ultrasonic bonding is "L11" as illustrated in FIGS. 31A and 31B and a length of the conductor 305 sandwiched between the anvil 321 and the horn 323 during ultrasonic bonding is "L12 (L12<L11)" as illustrated in FIGS. 32A and 32B, the pressure received by the conductor 305 during ultrasonic bonding becomes larger in the mode illustrated in FIGS. 32A and 32B, and an outer diameter d12 of the bonded portion 309 becomes smaller than an outer diameter d11 of the bonded portion 309 illustrated in FIGS. 31A and 31B.

However, the exposed conductor is cut to a certain length by providing the blade portion 29 on the anvil 16, and thus, the length of the conductor 7 ultrasonically bonded by the anvil 16 and the horn 18 becomes substantially constant even if the position of the electric wire 3 relative to the anvil 16 and the horn 18 slightly changes so that the pressure (force per unit area) received by the conductor 7 does not change and the shape of the bonded portion 11 is stabilized.

Further, an inter-core resistance (electric resistance between the strands 15 at the bonded portion 11) becomes substantially constant as the shape of the bonded portion 11 is stabilized so that shapes of the wire barrel portion 13 and the bonded portion 11 after crimping are stabilized and the crimping performance of the wire barrel portion 13 to the bonded portion 11 is stabilized.

Meanwhile, the bonded portion 11 protrudes from the wire barrel portion 13 in the front-rear direction in the terminal-equipped electric wire 1 illustrated in FIG. 3, but an end of the bonded portion 11 may be accommodated in the wire barrel portion 13.

Figure 16:
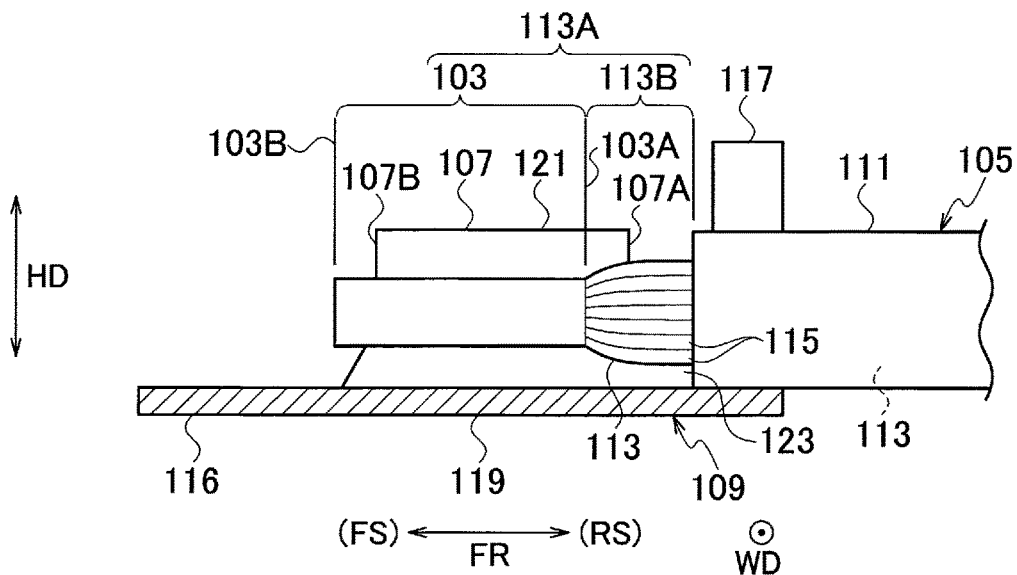
FIG. 16 is a view illustrating a state before fixing a terminal to an electric wire in a terminal-equipped electric wire according to a modification.
Figure 17:
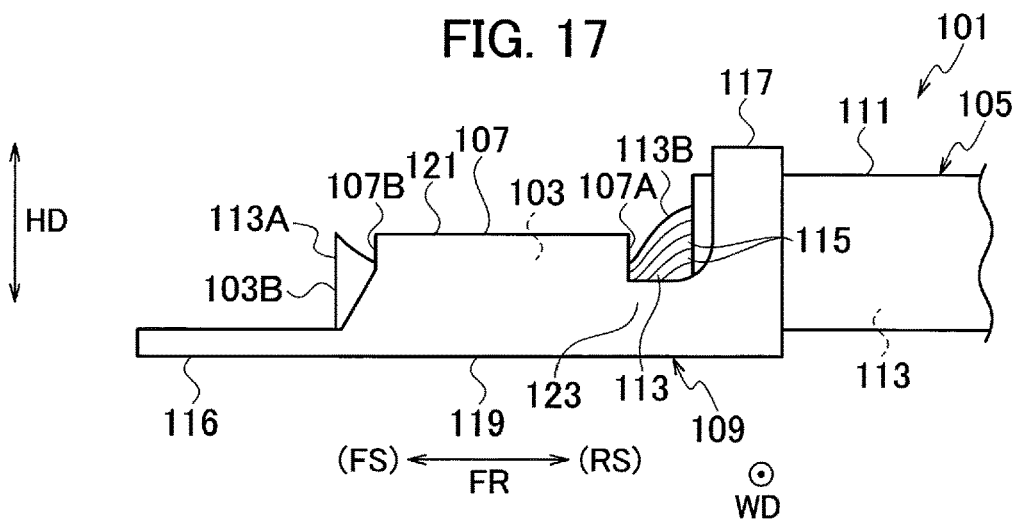
FIG. 17 is a view illustrating a schematic configuration of the terminal-equipped electric wire according to the modification.
Figure 18:
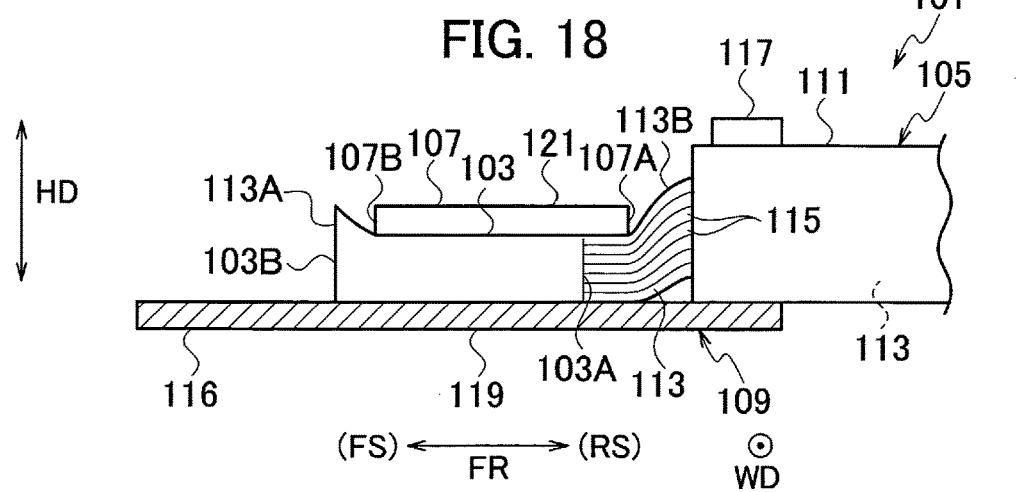
FIG. 18 is a cross-sectional view illustrating the schematic configuration of the terminal-equipped electric wire according to the modification.

For example, as illustrated in FIGS. 16 to 18, an end (rear end) 107A of a wire barrel portion 107 (the wire barrel portion 13) positioned on a side of a sheath 111 (the sheath 9) may be positioned to be closer to the sheath 111 (the rear side) than an end (rear end) 103A of a bonded portion 103 (the bonded portion 11) positioned on the side of the sheath 111 in a terminal-equipped electric wire 101 (the terminal-equipped electric wire 1).

Figure 20:
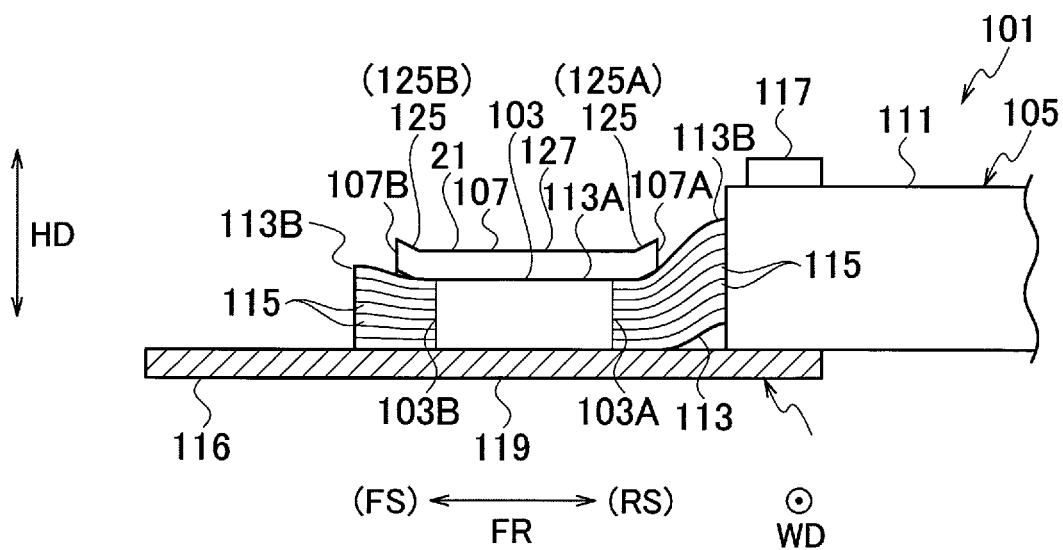
FIG. 20 is a cross-sectional view illustrating a schematic configuration of the terminal-equipped electric wire according to another modification.
Figure 21:
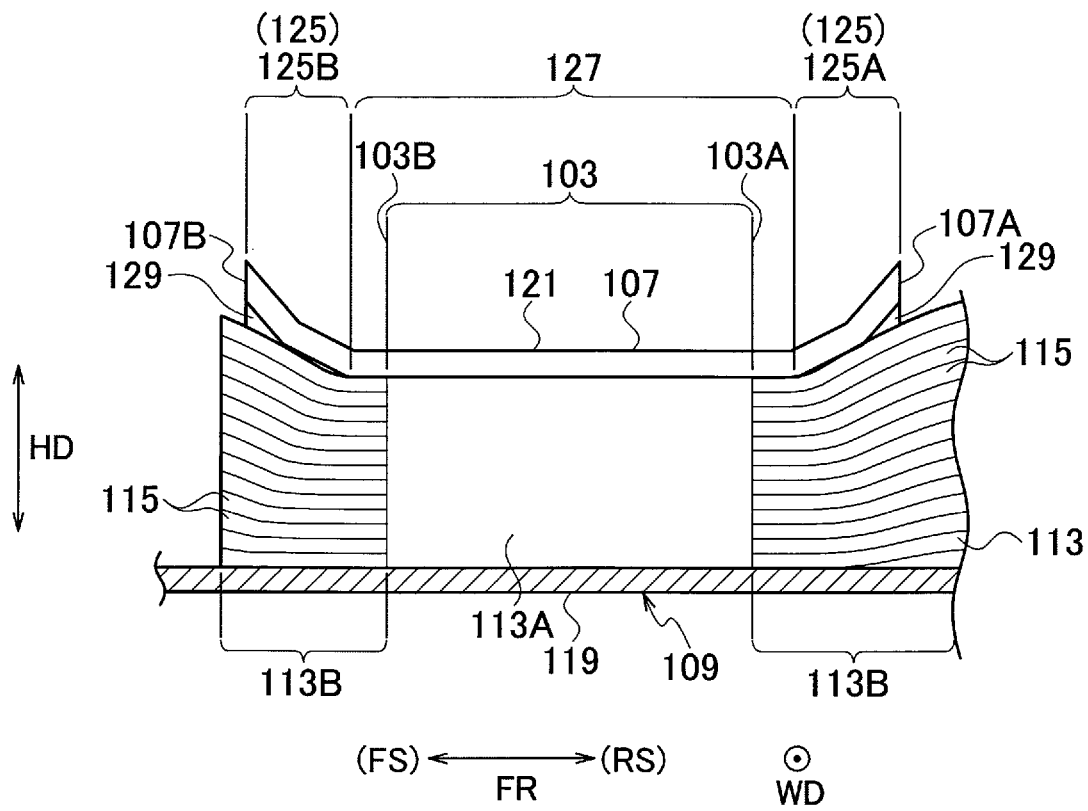
FIG. 21 is a view schematically illustrating a terminal-equipped electric wire of FIG. 20.

Further, the bonded portion 103 may be positioned at the inner side of the wire barrel portion 107 in the front-rear direction as illustrated in FIGS. 20 and 21.

Here, the terminal-equipped electric wire 101 illustrated in FIGS. 16 to 18 will be described in detail. Incidentally, no bell mouth portion is provided in the terminal-equipped electric wire 101 illustrated in FIGS. 16 to 18.

The terminal-equipped electric wire 101 includes an electric wire 105 (the electric wire 3) in which the bonded portion 103 is formed and a terminal (terminal fitting) 109 (the terminal 5) having the wire barrel portion 107.

As described above, the sheath 111 is not present over a predetermined length at a part (for example, one end portion) in the longitudinal direction (length direction) (for example, a part of the sheath 111 is removed) so that a conductor 113 (the conductor 7) is exposed in the electric wire 105.

Further, the bonded portion 103 where the conductor 113 is bonded is formed over a predetermined length at a part of an exposed conductor (exposed conductor) 113A in the electric wire 105. The bonded portion 103 is formed by, for example, ultrasonically bonding a plurality of strands 115 (the strands 15) for the conductor 113 to each other.

More specifically, the electric wire 105 includes the conductor (core wire) 113 formed by gathering the plurality of strands 115 and the sheath (insulator) 111 covering (coating) the conductor 113.

The strand 115 of the conductor 113 is formed in an elongated cylindrical shape with metal such as copper, aluminum, and an aluminum alloy. The conductor 113 is configured in a form in which the plurality of strands 115 is twisted or a form in which the plurality of strands 115 collectively extends in a straight line.

Further, the electric wire 105 has flexibility. A cross section of a portion of the electric wire 105 where the sheath 111 is present (the cross section taken along a plane orthogonal to the longitudinal direction) is formed in a predetermined shape such as a circular shape.

A cross section of the conductor 113 at the portion of the electric wire 105 where the sheath 111 is present is formed, for example, in a substantially circular shape by bundling the plurality of strands 115 with almost no gap. A cross section of the sheath 111 at the portion of the electric wire 105 where the sheath 111 is present is formed, for example, in an annular shape having a predetermined width (thickness). The entire inner circumference of the sheath 111 is in contact with the entire outer circumference of the conductor 113.

In the bonded portion 103, the plurality of strands 115 for the conductor 113 is ultrasonically bonded to each other as described above such that the conductor 113 is bonded to each other. For example, the conductor 113 is made into a single wire in the bonded portion 103.

Although the bonded portion 103 is formed by the ultrasonic bonding in the above description, the bonded portion 103 may be formed by bonding the strands 115 to each other by a bonding means other than the ultrasonic bonding. For example, the bonded portion 103 may be formed in the same manner as in the case of ultrasonic bonding by metallurgically bonding the strands 115 to each other at a temperature equal to or lower than a recrystallization temperature of the strand 115.

The bonded portion 103 and the sheath 111 are apart from each other by a predetermined length, for example, in the longitudinal direction of the electric wire 105. As a result, a plurality of the strands (a conductor 113B in a non-bonded state), which is in contact with each other but is in a non-bonded state, is exposed between the bonded portion 103 and the sheath 111.

That is, the bonded portion 103 having the predetermined length, the conductor 113B in the non-bonded state, the conductor 113 covered with the sheath 111 (a portion of the electric wire 105 where the sheath 111 is present) are arranged in this order from one end to the other end in the longitudinal direction of the electric wire 105.

A sectional shape (sectional shape taken along a plane orthogonal to the longitudinal direction) of the bonded portion 103 before fixing of the terminal 109 is formed in a predetermined shape such as a shape approximating a circle as described with examples in FIGS. 4A, 6B, 7B, 8B, and 9B.

Further, a sectional shape (sectional shape taken along the plane orthogonal to the longitudinal direction) of the conductor 113B in a non-bonded state before fixing of the terminal 109 gradually shifts from the sectional shape of the bonded portion 103 to a sectional shape of the conductor 113 covered with the sheath 111.

In the terminal-equipped electric wire 101, the longitudinal direction of the electric wire 105 or the conductor 113 and the front-rear direction of the wire barrel portion 107 (the terminal 109) coincide with each other. In addition, one end of the electric wire 105 in the longitudinal direction is positioned on the front side, and the other end of the electric wire 105 in the longitudinal direction is positioned on the rear side.

In the terminal-equipped electric wire 101, an end (a rear end; an end positioned on a side of the sheath 111 in the front-rear direction) 107A of the wire barrel portion 107 of the terminal 109 is positioned to be closer to the sheath 111 (the rear side) than an end (a rear end; an end positioned on the side of the sheath 111 in the longitudinal direction) 103A of the bonded portion 103. In the terminal-equipped electric wire 101, the wire barrel portion 107 wraps and covers at least a part of the bonded portion 103, for example, by crimping the wire barrel portion 107.

The terminal 109 is formed, for example, by forming a flat metal material into a predetermined shape, and then, folding the material formed in the predetermined shape.

The terminal 109 has, for example, a terminal connection portion 116 (the mating terminal connection portion 25) to be connected to a mating terminal, the wire barrel portion 107, and an insulation barrel portion 117 (the insulation barrel portion 27) are arranged in this order from the front side to the rear side.

A sectional shape (section shape taken along a plane orthogonal to the front-rear direction) of the wire barrel portion 107 before being crimped is formed in, for example, a "U" shape including a bottom plate portion (arc-shaped bottom plate portion) 119 whose thickness direction is substantially the height direction and a pair of side plate portions 121. The pair of side plate portions 121 is erected obliquely upward, respectively, from both ends of the bottom plate portion 119 in the width direction. A dimensional value (dimensional value in the width direction) of a portion between the pair of side plate portions 121 gradually increases from the lower side to the upper side.

A sectional shape (sectional shape taken along the plane orthogonal to the front-rear direction) of the insulation barrel portion 117 before being crimped is also formed in the "U" shape similar to the cross section of the wire barrel portion 107.

In the terminal-equipped electric wire 101, the bonded portion 103 and the wire barrel portion 107 are integrated as the wire barrel portion 107 is crimped, and the sheath 111 and the insulation barrel portion 117 are integrated as the insulation barrel portion 117 is crimped.

The crimping of the wire barrel portion 107 or the insulation barrel portion 117 is mainly performed as the pair of side plate portions is plastically deformed so that the wire barrel portion 107 and the insulation barrel portion 117 are formed in a tubular shape. The bonded portion 103 is deformed as the wire barrel portion 107 is crimped.

For example, the wire barrel portion 107 and the insulation barrel portion 117 are slightly apart from each other (a connection portion 123 is provided therebetween) in the front-rear direction, but the insulation barrel portion 117 may be in contact with the wire barrel portion 107.

Here, a relationship between the electric wire 105 and the terminal 109 in the front-rear direction will be described in more detail.

In the longitudinal direction of the electric wire 105, the bonded portion 103 by the predetermined length, the conductor 113B in the non-bonded state, and the conductor 113 covered with the sheath 111 are arranged in this order from the front side to the rear side as described above. A length of the conductor 113 covered with the sheath 111 is much longer than the length of the bonded portion 103 or the conductor 113B in the non-bonded state.

In the front-rear direction of the terminal 109, the terminal connection portion 116, the wire barrel portion 107, the connection portion 123 between the wire barrel portion 107 and the insulation barrel portion 117, and the insulation barrel portion 117 are arranged is in this order from the front side to the rear side as described above. A value of a dimension of the wire barrel portion 107 in the front-rear direction is larger than a value of a dimension of the connection portion 123 or the insulation barrel portion 117 in the front-rear direction.

In the terminal-equipped electric wire 101, one end (front end) 103B of the bonded portion 103 is positioned slightly at the front side of a front end 107B of the wire barrel portion 107 in the front-rear direction as illustrated in FIG. 18. Thus, one end portion of the bonded portion 103 protrudes slightly to the front side from the front end 107B of the wire barrel portion 107. A value of a protruding dimension of the bonded portion 103 from the wire barrel portion 107 (protruding amount to the front side) is smaller than a value of a height of the bonded portion 103.

The one end (front end) 103B of the bonded portion 103 may be positioned slightly at the rear side of the front end 107B of the wire barrel portion 107.

The other end (rear end) 103A of the bonded portion 103 is positioned slightly at the front side of the rear end 107A of the wire barrel portion 107. As a result, a front end portion of the conductor 113B in the non-bonded state between the bonded portion 103 and the sheath 111 is wrapped by the wire barrel portion 107.

A value of a dimension (a value of a dimension in the front-rear direction) between the rear end 103A of the bonded portion 103 and the rear end 107A of the wire barrel portion 107 is also smaller than the value of the height of the bonded portion 103.

In the terminal-equipped electric wire 101, a value of a height of the conductor 113B in the non-bonded state gradually increases from the front side to the rear side. A front end of the sheath 111 of the electric wire 105 (the rear end of the conductor 113B in the non-bonded state) is positioned slightly at the front side of a front end of the insulation barrel portion 117.

According to the terminal-equipped electric wire 101, the wire barrel portion 107 covers the bonded portion 103 such that the rear end 107A of the wire barrel portion 107 is positioned at the rear side of the rear end 103A of the bonded portion 103, and thus, it is possible to suppress occurrence of breakage of the strand 115 at the boundary portion of the bonded portion 103 (a boundary between the bonded portion 103 and the conductor 113B in the non-bonded state) 103A.

Figure 26:
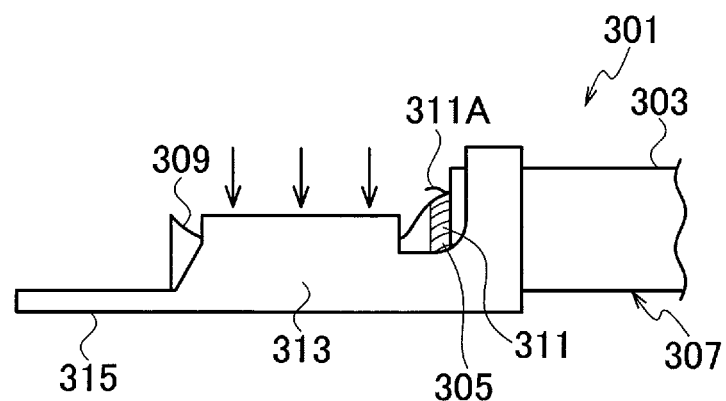
FIG. 26 is a view illustrating the conventional terminal-equipped electric wire.

That is, when the wire barrel portion 107 is crimped to the electric wire 105 in which the bonded portion 103 has been formed to crimp the terminal 109, the rear end (the boundary portion between the bonded portion and the conductor in the non-bonded state) 103A of the bonded portion 103 is positioned within the wire barrel portion 107, and thus, the boundary portion 103A is hardly pulled by crimping of the terminal 109, and it is possible to suppress the occurrence of breakage of the core wire at the boundary portion 103A (breakage of the strand 115 in the conductor 113B in the non-bonded state; breakage of the strand indicated by a reference sign 311A in FIG. 26).

As the strand breakage is suppressed, the performance of the crimped portion is stabilized (the degree of mechanical bonding and the degree of electrical bonding between the electric wire 105 and the terminal 109 are stabilized), and the occurrence of contamination is suppressed.

Figure 19:
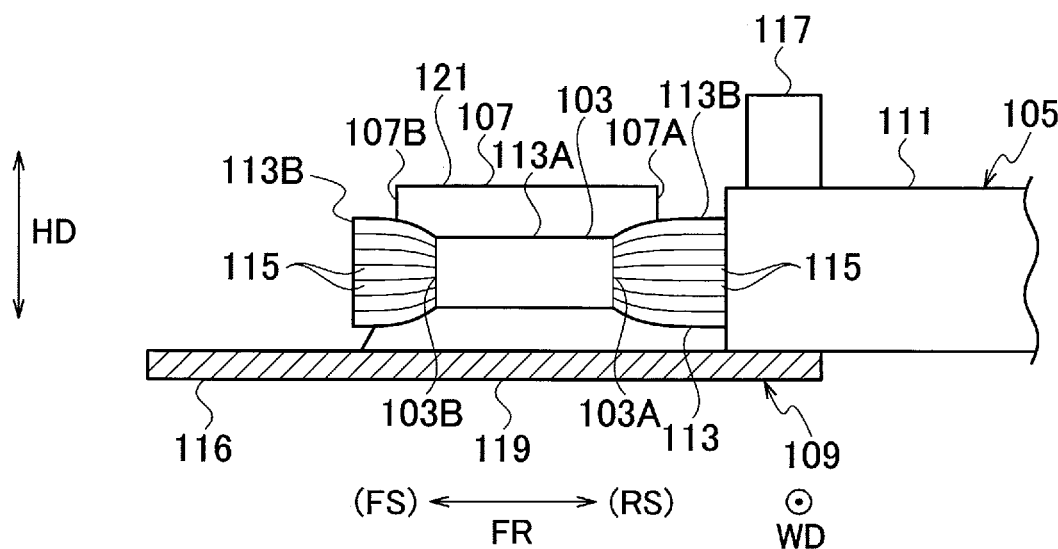
FIG. 19 is a view illustrating a state before fixing a terminal to a wire in a terminal-equipped electric wire according to another modification.
Figure 27:
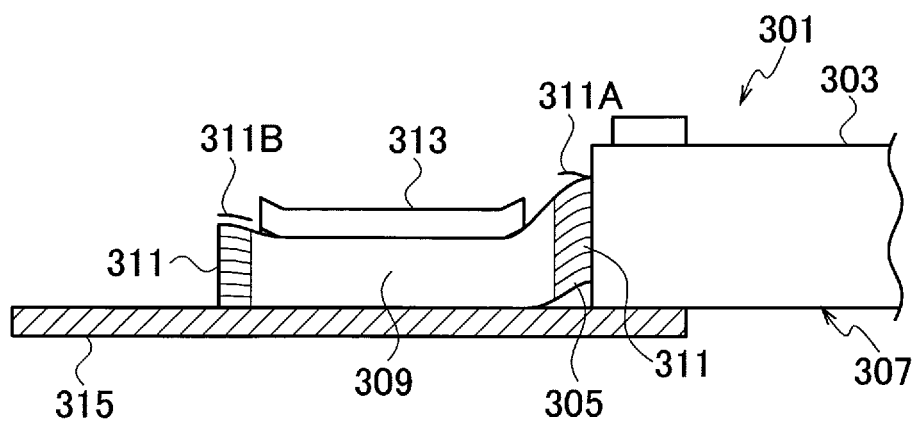
FIG. 27 is a view illustrating the conventional terminal-equipped electric wire.
Figure 28A:
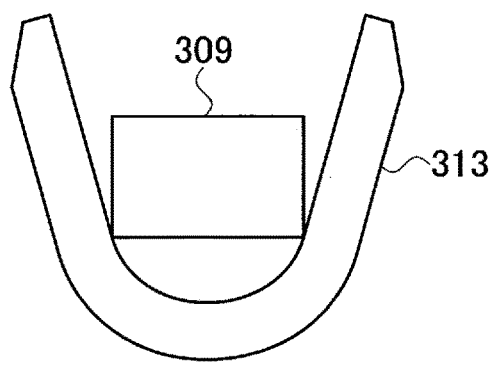
FIG. 28A is a view illustrating crimping of a wire barrel portion in the conventional terminal-equipped electric wire.
Figure 28B:
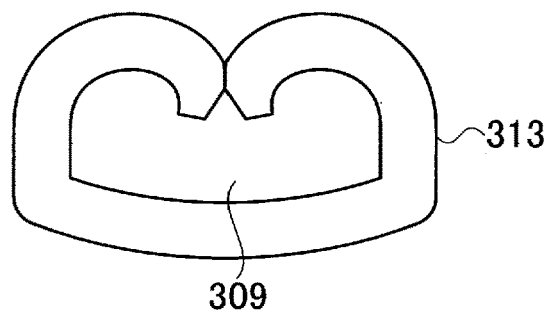
FIG. 28B is a view illustrating crimping of a wire barrel portion in the conventional terminal-equipped electric wire.
Figure 29A:
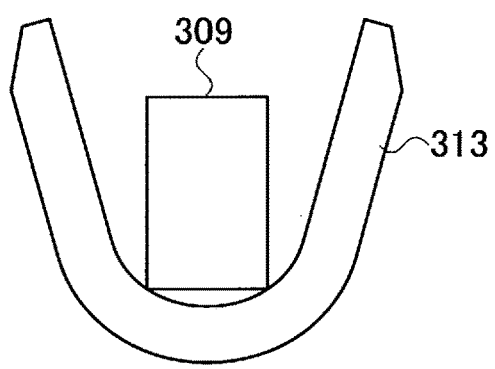
FIG. 29A is a view illustrating crimping of the wire barrel portion in the conventional terminal-equipped electric wire.
Figure 29B:
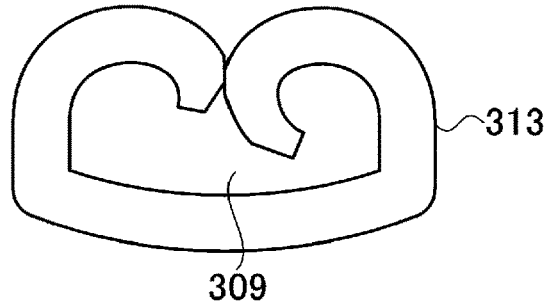
FIG. 29B is a view illustrating crimping of the wire barrel portion in the conventional terminal-equipped electric wire.

In the above description, the bonded portion 103 slightly protrudes to the front side from the front end 107B of the wire barrel portion 107 as illustrated in FIG. 18 and the like, but the front end 107B of the wire barrel portion 107 may be positioned on the front side of the front end 103B of the bonded portion 103 as illustrated in FIGS. 19 and 20. That is, the value of the dimension of the wire barrel portion 107 in the front-rear direction may be larger than the value of the dimension of the bonded portion 103 in the front-rear direction, and the bonded portion 103 may be positioned at the inner side of the wire barrel portion 107 in the front-rear direction. As a result, it is possible to suppress the occurrence of strand breakage indicated by reference signs 311A and 311B in FIG. 27.

Meanwhile, the terminal-equipped electric wire 101 illustrated in FIG. 20 is provided with a bell mouth portion 125 (bell mouth portion 43). In this case, the bell mouth portion 125 is provided in a mode of protruding to the rear side from the rear end 107A of the wire barrel portion 107 of the terminal-equipped electric wire 101 illustrated in FIGS. 16 to 18 and a mode of protruding to the front side from the front end 107B of the wire barrel portion 107 of the terminal-equipped electric wire 101 illustrated in FIGS. 16 to 18.

In the terminal-equipped electric wire 101 illustrated in FIG. 19 or 20, the wire barrel portion 107 includes a body portion 127 and a pair of the bell mouth portions 125 (a rear bell mouth portion 125A and a front bell mouth portion 125B). In the front-rear direction, the front bell mouth portion 125B, the body portion 127, and the rear bell mouth portion 125A are arranged in this order from the front side to the rear side.

More specifically, the bell mouth portion 125 (the rear bell mouth portion 125A) is formed at an end portion (rear end portion) of the wire barrel portion 107 positioned on the side of the sheath 111.

In the terminal-equipped electric wire 101 illustrated in FIG. 19 or 20, a front end of the rear bell mouth portion 125A (an end on the opposite side of the rear end positioned on the side of the sheath 111 in the front-rear direction; a boundary between the rear bell mouth portion 125A and the body portion 127) is positioned to be closer to the sheath 111 (the rear side) than the rear end (the end positioned on the side of the sheath 111 in the longitudinal direction) 103A of the bonded portion 103.

In the terminal-equipped electric wire 101 illustrated in FIG. 19 or 21, the body portion 127 of the wire barrel portion 107 is formed in a tubular shape whose diameter is substantially constant in the front-rear direction, and the rear bell mouth portion 125A is formed in a tubular shape whose diameter gradually increases as being apart from the body portion 127 (from the front side to the rear side). A diameter of the front end of the rear bell mouth portion 125A (a diameter at the boundary between the rear bell mouth portion 125A and the body portion 127) coincides with the diameter of the body portion 127.

In the terminal-equipped electric wire 101 illustrated in FIG. 19 or 20, the front bell mouth portion 125B is formed in a tubular shape whose diameter gradually increases as being apart from the body portion 127 (from the rear side to the front side), which is similar to the rear bell mouth portion 125A.

In the terminal-equipped electric wire 101 illustrated in FIG. 19 or 20, a dimension of the front bell mouth portion 125B in the front-rear direction and a dimension of the rear bell mouth portion 125A in the front-rear direction are smaller than the value of the height of the bonded portion 103, and a dimension of the body portion 127 of the wire barrel portion 107 in the front-rear direction is larger than the value of the height of the bonded portion 103.

In the terminal-equipped electric wire 101 illustrated in FIG. 19 or 20, a value of a height or a diameter of the conductor 113 present between the body portion 127 of the wire barrel portion 107 and the sheath 111 (the conductor 113B in the non-bonded state at the rear side positioned between the front end of the rear bell mouth portion 125A and the sheath 111) gradually increases in the front-rear direction.

In the terminal-equipped electric wire 101 illustrated in FIG. 19 or 20, the conductor (the conductor in the non-bonded state at the front side) 113B in the non-bonded state protrudes to the front side from the front end of the bonded portion 103 of the electric wire 105 by a predetermined length.

As a result, in the terminal-equipped electric wire 101 illustrated in FIG. 19 or 20, the rear end (the boundary between the conductor 113B in the non-bonded state at the front side and the bonded portion 103) of the conductor 113B in the non-bonded state at the front side is positioned at the rear side of the rear end of the front bell mouth portion 125B, and the front end of the conductor 113B in the non-bonded state at the front side is positioned at the front side of the front end of the front bell mouth portion 125B in the front-rear direction.

Further, a slight gap 129 is formed between the conductor 113 (conductor 113B in the non-bonded state at the front side) and the front bell mouth portion 125B at the front end (opening at the front end) of the front bell mouth portion 125B, and the slight gap 129 is also formed between the conductor 113 and the rear bell mouth portion 125A at the rear end (opening at the rear end) of the rear bell mouth portion 125A as illustrated in FIG. 21.

Incidentally, it may be configured in such a manner that the front bell mouth portion 125B and the conductor 113 are in contact with each other at the front end (opening at the front end) of the front bell mouth portion 125B so that the front bell mouth portion 125B restrains the conductor 113, and the rear bell mouth portion 125A and the conductor 113 are in contact with each other at the rear end (opening at the rear end) of the rear bell mouth portion 125A so that the rear bell mouth portion 125A restrains the conductor 113.

Further, any one of the front bell mouth portions 125A and 125B may be deleted in the terminal-equipped electric wire 101 illustrated in FIG. 20 or 21. For example, the front bell mouth portion 125B may be deleted.

According to the terminal-equipped electric wire 101 illustrated in FIG. 20 or 21, the bonded portion 103 is positioned at the inner side of the body portion (body portion excluding the bell mouth portion 125) 127 of the wire barrel portion 107, and thus, it is possible to suppress the occurrence of conductor breakage when the terminal 109 is fixed to the electric wire 105.

Further, a part of the conductor 113B in the non-bonded state (a portion on the side of the bonded portion 103) is accommodated in the bell mouth portion 125 according to the terminal-equipped electric wire 101 illustrated in FIG. 20 or 21, and thus, it is possible to further suppress the occurrence of conductor breakage at the boundary portion between the bonded portion 103 and the conductor 113B in the non-bonded state.

Although the bonded portion 103 is positioned at the inner side of the body portion 127 of the wire barrel portion 107 in the terminal-equipped electric wire 101 illustrated in FIG. 20 or 21 provided with the bell mouth portion 125, the front end 103B of the bonded portion 103 may be positioned at an intermediate portion of the front bell mouth portion 125B and the rear end 103A of the bonded portion 103 may be positioned in an intermediate portion of the rear bell mouth portion 125A in the front-rear direction.

Figure 22:
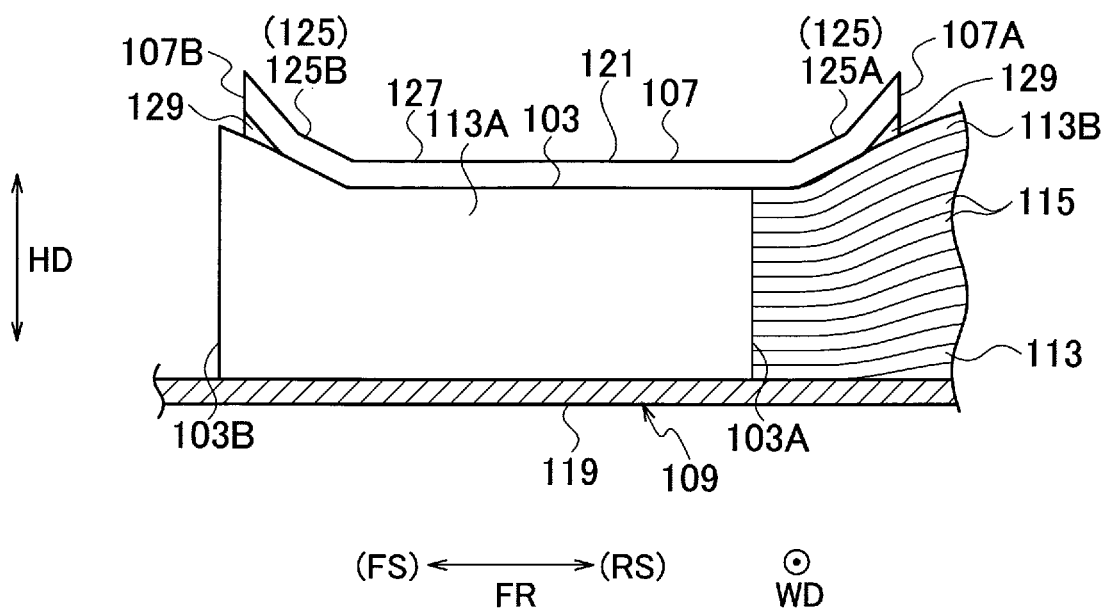
FIG. 22 is a view schematically illustrating a modification of the terminal-equipped electric wire of FIG. 21.

Alternatively, the conductor 113B in the non-bonded state at the front side may be deleted as illustrated in FIG. 22. Although the front end of the bonded portion 103 is positioned at the front side of the front end of the front bell mouth portion 125B in the terminal-equipped electric wire 101 illustrated in FIG. 22, the front end of the bonded portion 103 may be positioned at the rear side of the rear end of the front bell mouth portion 125B and the front end of the bonded portion 103 may be positioned at the front bell mouth portion 125B.

Although the conductor 113B in the non-bonded state protrudes slightly to the front side from the front end 103B of the bonded portion 103 in FIG. 21, the conductor 113B in the non-bonded state protruding to the front side from the front end 103B of the bonded portion 103 may be deleted.

According to the terminal-equipped electric wire 101 illustrated in FIG. 21, the bonded portion 103 is positioned at the inner side of the wire barrel portion 107 in the front-rear direction, and thus, it is possible to suppress the occurrence of strand breakage at both the ends (the rear end 103A and the front end 103B) of the bonded portion 103.

Figure 23:
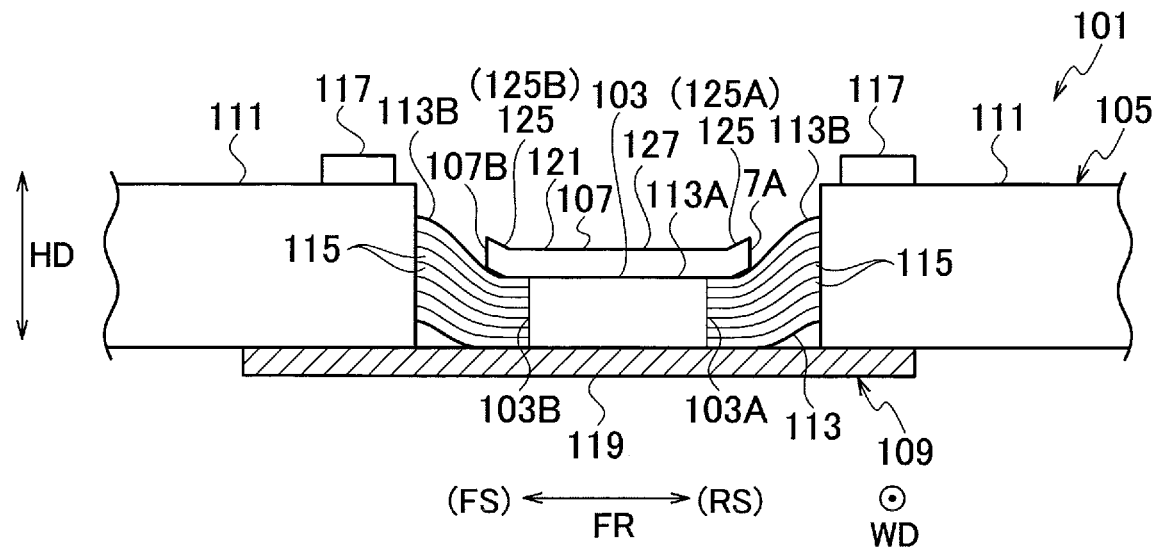
FIG. 23 is a view illustrating a terminal-equipped electric wire according to a modification in which a bonded portion is formed at an intermediate portion in the longitudinal direction of an electric wire and a terminal is fixed to the bonded portion.

Although the bonded portion 103 is formed at one end portion of the electric wire 105 in the longitudinal direction and the terminal 109 is fixed to the bonded portion 103 in the above description, the bonded portion 103 may be formed at an intermediate portion of the electric wire 105 in the longitudinal direction, and the terminal 109 may be fixed to the bonded portion 103 as illustrated in FIG. 23.

More specifically, the terminal 109 may be fixed to the bonded portion 103 of the electric wire in which the conductor 113 covered with the sheath 111 (an one-end-side portion of the electric wire where the sheath is present), the conductor 113B in the non-bonded state (conductor in the non-bonded state at one end side), the bonded portion 103, the conductor 113B in the non-bonded state (conductor in the non-bonded state at the other end side), and the conductor 113 covered with the sheath 111 (an other-end-side portion of the electric wire where the sheath is present) are arranged in this order from one side to the other side in the longitudinal direction of the electric wire 105.

In such a terminal-equipped electric wire, a value of a length of the wire barrel portion 107 (or the body portion 127 of the wire barrel portion) of the terminal 109 in the longitudinal direction of the electric wire 105 (the front-rear direction of the terminal 109) is larger than a value of a length of the bonded portion 103, and the bonded portion 103 is positioned at the inner side of the wire barrel portion 107 (or the body portion 127 of the wire barrel portion) of the terminal 109 in the longitudinal direction of the electric wire 105 (the front-rear direction of the terminal 109).

Figure 24:
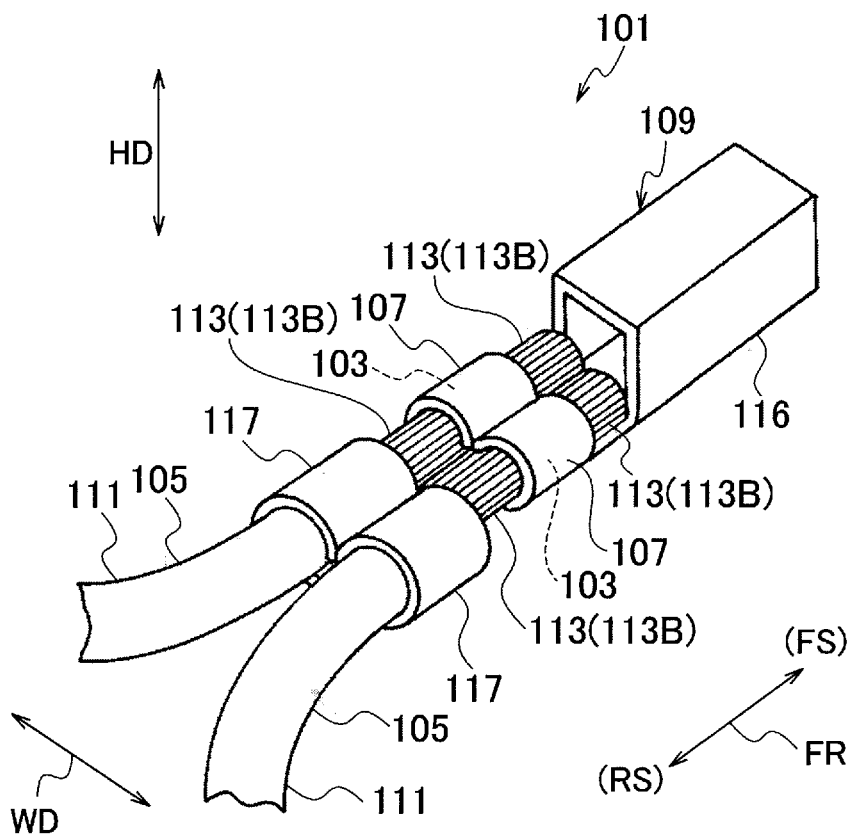
FIG. 24 is a view illustrating a terminal-equipped electric wire according to a modification in which one terminal is fixed to a plurality of (for example, two) electric wires.
Figure 25A:
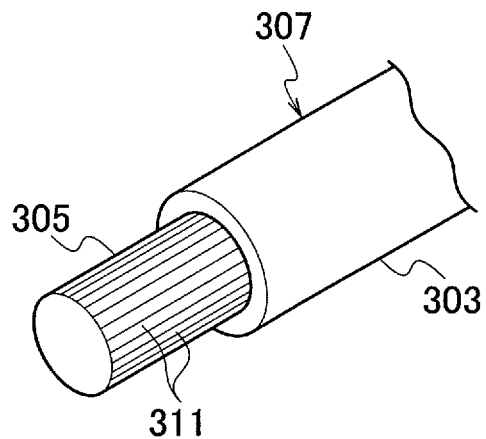
FIG. 25A is a view illustrating a conventional terminal-equipped electric wire.
Figure 25B:
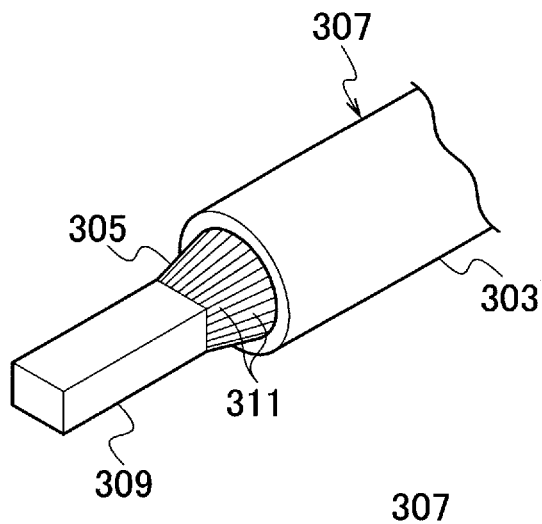
FIG. 25B is a view illustrating a conventional terminal-equipped electric wire.
Figure 25C:
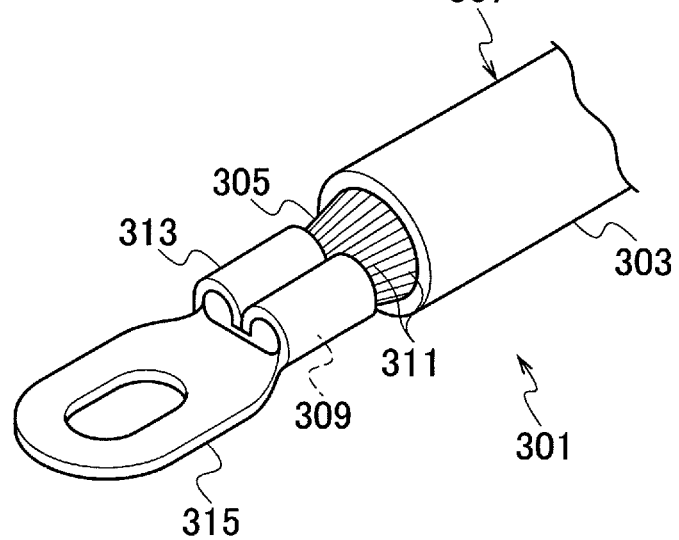
FIG. 25C is a view illustrating a conventional terminal-equipped electric wire.

Further, single terminal 109 is fixed to single electric wire 105 in the above description, but one terminal 109 may be fixed to a plurality of (for example, two) electric wires 105 as illustrated in FIG. 24. That is, the wire barrel portion 107 may be provided at the bonded portion 103 of each electric wire in the same manner as the above-described case.

Further, when the one terminal 109 is fixed to the plurality of electric wires 105, the bonded portion 103 may be formed individually in each of the conductors 113 of the electric wires 105 and the one terminal 109 (one wire barrel portion 107) may be fixed to each of the electric wires 105, or alternatively, the conductors 113 of at least two electric wires 105 among the respective electric wires 105 may be collected to form the bonded portion (bonded portion having a sectional shape in which the minimum value of the above-described distance is "1" and the maximum value of the above-described distance is smaller than "1.81") 103 at such a collected portion and the one terminal 109 may be fixed to the respective electric wires 105.

Further, when the one terminal 109 is fixed to the plurality of electric wires 105, at least one electric wire 105 among the respective electric wires 105 may have a form in which the bonded portion 103 is formed at an intermediate portion of the electric wire 105 in the longitudinal direction.

What is claimed is:

1. A method for manufacturing a terminal-equipped electric wire, the method comprising:
forming, in an electric wire, a bonded portion in which strands of a conductor are bonded to each other in at least a part of the conductor in a longitudinal direction exposed due to absence of a sheath at a part of the electric wire in the longitudinal direction; and
fixing a terminal including a wire barrel portion to the electric wire such that the wire barrel portion covers at least a part of the bonded portion,
wherein a sectional shape of the bonded portion before the fixing of the terminal is formed in such a shape that a variable range of a value of a distance between a geometric center of a cross section of the bonded portion and the wire barrel portion falls within a range of 0.71 to 1.29 when rotating the bonded portion by an arbitrary angle while engaging the bonded portion with the wire barrel portion within the wire barrel portion,
wherein the terminal is fixed to the electric wire such that an end of the wire barrel portion positioned on a side of the sheath is positioned to be closer to the sheath than an end of the bonded portion positioned on the side of the sheath,
wherein the end of the wire barrel portion positioned on the side of the sheath is separated from the sheath,
wherein the longitudinal direction of the electric wire and a front-rear direction of the wire barrel portion coincide with each other, and
the bonded portion is positioned at an inner side of the wire barrel portion in the front-rear direction.

2. The method for manufacturing a terminal-equipped electric wire according to claim 1, wherein
the variable range of the value of the distance falls within a range of 0.8 to 1.2.

3. The method for manufacturing a terminal-equipped electric wire according to claim 1, wherein
the sectional shape of the bonded portion before the fixing of the terminal is formed in a circular shape or a shape approximating a circle, a regular polygonal shape having a number of corners equal to or more than a number of corners of a square, or a shape approximating a regular polygonal shape.

4. The method for manufacturing a terminal-equipped electric wire according to claim 1, wherein
a cross section of the wire barrel portion of the terminal before being fixed to the bonded portion is formed in a U-shape including an arcuate bottom plate portion whose curvature radius is equal to or slightly larger than a radius of a circle or a circumscribed circle of the bonded portion and a pair of side plate portions, and
the wire barrel portion is fixed to the electric wire by crimping the wire barrel portion while bringing the bonded portion into contact with a bottommost portion of an inner surface of the bottom plate portion or vicinity of the bottommost portion, within the wire barrel portion.

5. The method for manufacturing a terminal-equipped electric wire according to claim 1, wherein
the exposed conductor is cut at an intermediate portion of the exposed conductor in the longitudinal direction.

6. A terminal-equipped electric wire comprising a plurality of electric wires fixed to one terminal by the method for manufacturing the terminal-equipped electric wire according to claim 1.

* * * * *